United States Patent
Arai et al.

(10) Patent No.: US 8,040,613 B2
(45) Date of Patent: Oct. 18, 2011

(54) ZOOM LENS, OPTICAL APPARATUS, AND METHOD FOR FORMING AN IMAGE OF AN OBJECT

(75) Inventors: Daisaku Arai, Kawasaki (JP); Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 383 days.

(21) Appl. No.: 12/037,927

(22) Filed: Feb. 26, 2008

(65) Prior Publication Data

US 2008/0218878 A1  Sep. 11, 2008

(30) Foreign Application Priority Data

Mar. 5, 2007  (JP) .................................. 2007-054415

(51) Int. Cl.
*G02B 15/14* (2006.01)

(52) U.S. Cl. ........ 359/680; 359/676; 359/681; 359/682; 359/683; 359/684; 359/685; 359/686; 359/689; 359/691; 359/708; 359/713; 359/714; 359/715; 359/726; 359/740

(58) Field of Classification Search .................. 359/676, 359/680–686, 689, 691, 708, 713–715, 726, 359/740

See application file for complete search history.

(56) References Cited

U.S. PATENT DOCUMENTS

| | | | |
|---|---|---|---|
| 6,091,551 A | 7/2000 | Watanabe | |
| 6,249,374 B1 | 6/2001 | Chipper | |
| 6,452,730 B2 | 9/2002 | Sato | |
| 6,587,280 B2 | 7/2003 | Horiuchi | |
| 6,693,750 B2 | 2/2004 | Sato | |
| 7,142,370 B2 | 11/2006 | Sato | |
| 2004/0021953 A1 | 2/2004 | Betensky et al. | |
| 2006/0250700 A1* | 11/2006 | Sekita | 359/680 |
| 2007/0211350 A1* | 9/2007 | Kurioka | 359/680 |

FOREIGN PATENT DOCUMENTS

| | | |
|---|---|---|
| CN | 1725094 A | 1/2006 |
| EP | 1 717 624 A | 11/2006 |
| JP | 62-143011 A | 6/1987 |
| JP | 10-213746 A | 8/1998 |
| JP | 2000-275525 A | 10/2000 |
| JP | 2001-318315 A | 11/2001 |
| JP | 2002-014283 A | 1/2002 |
| JP | 2005-352347 | 12/2005 |
| JP | 2006-208890 A | 8/2006 |

* cited by examiner

*Primary Examiner* — Evelyn A. Lester

(74) *Attorney, Agent, or Firm* — Miles & Stockbridge P.C.

(57) ABSTRACT

In a zoom lens ZL1 having a plurality of lens groups G1 to G2 which are disposed in order from an object, where a refractive index average value of the lens components which constitute the zoom lens ZL1 is defined as ndav and a refractive index average value of the lens components which constitute the first lens group G1 which is disposed to closest to the object among the plurality of lens groups G1 to G2 is defined as ndGlav, the zoom lens ZL1 is constituted to satisfy the conditional expression ndav≧1.80 and to satisfy the conditional expression ndGlav≧1.85.

32 Claims, 22 Drawing Sheets

ZOOM LENS, OPTICAL APPARATUS, AND METHOD FOR FORMING AN IMAGE OF AN OBJECT

INCORPORATION BY REFERENCE

This invention claims the benefit of Japanese Patent Application No. 2007-054415 which is hereby incorporated by reference.

FIELD OF THE INVENTION

The present invention relates to a zoom lens that is used in an optical apparatus such as a digital still camera.

BACKGROUND OF THE INVENTION

In recent years, portability has become important for optical apparatuses such as digital still cameras that comprise a solid-state image pickup apparatus and steps toward miniaturization of zoom lenses which are photographic lenses have been taken. In this regard, an example in which miniaturization of an entire optical system is performed by using glass with a high refractive index is also illustrated (See Japanese Patent Application Laid Open No. 2001-318315, for example).

Problems to be Solved by the Invention

However, a demand for further miniaturization of conventional zoom lenses of this kind has arisen.

SUMMARY OF THE INVENTION

The present invention was conceived in view of this demand and an object of the present invention is to provide a zoom lens with a more miniature constitution, an optical apparatus, and a method for forming an image of an object.

Means to Solve the Problems

In order to achieve the above object, the zoom lens according to the present invention is a zoom lens having a plurality of lens groups which are disposed in order from an object, wherein, where a refractive index average value of lens components which constitute the zoom lens is defined as ndav and a refractive index average value of lens components which constitute a first lens group which is disposed to closest to the object among the plurality of lens groups is defined as ndGlav, the condition of the following expressions $$ndav \geq 1.80$$

$$ndGlav \geq 1.85$$

are satisfied.

In the above zoom lens, the first lens group preferably has negative refractive power.

In the above zoom lens, the plurality of lens groups preferably comprises the first lens group and a second lens group which has positive refractive power and is disposed to an image side of the first lens group.

Additionally here, where the total length of the zoom lens in a wide-angle end state is defined as TLw, the total length of the zoom lens in a telephoto end state is defined as TLt, and a focal length of the zoom lens in the telephoto end state is defined as ft, the condition of the following expression $$1.0 < (TLw/ft + TLt/ft)/2 < 2.0$$

is preferably satisfied.

In the above zoom lens, the first lens group may also have positive refractive power.

Here, the plurality of lens groups preferably comprises, in order from the object, the first lens group, a second lens group which has negative refractive power, a third lens group which has positive refractive power, a fourth lens group which has positive refractive power, and a fifth lens group which has negative refractive power.

In the above zoom lens, the first lens group preferably comprises an optical element that bends the path of light.

Additionally here, the optical element is preferably a prism and a refractive index average value of optical members which constitute the first lens group is preferably equal to or more than 1.85.

In the above zoom lens, the first lens group preferably comprises a plurality of lens components.

In the above zoom lens, among the plurality of lens groups, the second lens group which is disposed to an image side of the first lens group preferably comprises a plurality of lens components.

In the above zoom lens, where the number of all the lens components which constitute the zoom lens is defined as GRn, the condition of the following expression $$4 < GRn < 16$$

is preferably satisfied.

In the above zoom lens, the first lens group preferably comprises a lens component which has an aspherical surface.

In the above zoom lens, where the total length of the zoom lens in a wide-angle end state is defined as TLw, the total length of the zoom lens in a telephoto end state is defined as TLt, a focal length of the zoom lens in the wide-angle end state is defined as fw, and a focal length of the zoom lens in the telephoto end state is defined as ft, the condition of the following expression $$2.5 < (TLw/fw + TLt/ft)/2 < 6.0$$

is preferably satisfied.

In the above zoom lens, where the total length of the zoom lens in a wide-angle end state is defined as TLw, the total length of the zoom lens in a telephoto end state is defined as TLt, and a focal length of the zoom lens in the wide-angle end state is defined as fw, the condition of the following expression $$3.0 < (TLw/fw + TLt/fw)/2 < 10.0$$

is preferably satisfied.

The optical apparatus according to the present invention is an optical apparatus equipped with the zoom lens according to the present invention.

An method for forming an image of an object according to the present invention is an method that uses a zoom lens having a plurality of lens groups that is disposed in order from the object to form an image of the object on a predetermined surface, wherein, where a refractive index average value of lens components which constitute the zoom lens is defined as ndav and a refractive index average value of the lens components which constitute a first lens group that is disposed to closest to the object among the plurality of lens groups is defined as ndGlav, the condition of the following expressions $$ndav \geq 1.80$$

$$ndGlav \geq 1.85$$

are satisfied.

In the above method, the first lens group preferably has negative refractive power.

In the above method, the plurality of lens groups preferably comprises the first lens group and a second lens group which has positive refractive power and is disposed to an image side of the first lens group.

In the above method, where the total length of the zoom lens in a wide-angle end state is defined as TLw, the total length of the zoom lens in a telephoto end state is defined as TLt, and a focal length of the zoom lens in the telephoto end state is defined as ft, the condition of the following expression $$1.0<(TLw/ft+TLt/ft)/2<2.0$$

is preferably satisfied.

In the above method, the first lens group preferably has positive refractive power.

In the above method, the plurality of lens groups preferably comprises, in order from the object, the first lens group, a second lens group which has negative refractive power, a third lens group which has positive refractive power, a fourth lens group which has positive refractive power, and a fifth lens group which has negative refractive power.

In the above method, the first lens group preferably comprises an optical element that bends the path of light.

In the above method, the optical element is preferably a prism and a refractive index average value of optical members which constitute the first lens group is preferably equal to or more than 1.85.

In the above method, the first lens group preferably comprises a plurality of lens components.

In the above method, among the plurality of lens groups, the second lens group that is disposed to an image side of the first lens group preferably comprises a plurality of lens components.

In the above method, where the number of all the lens components which constitute the zoom lens is defined as GRn, the condition of the following expression $$4<GRn<16$$

is preferably satisfied.

In the above method, the first lens group preferably comprises a lens component which has an aspherical surface.

In the above method, where the total length of the zoom lens in a wide-angle end state is defined as TLw, the total length of the zoom lens in a telephoto end state is defined as TLt, a focal length of the zoom lens in the wide-angle end state is defined as fw, and a focal length of the zoom lens in the telephoto end state is defined as ft, the condition of the following expression $$2.5<(TLw/fw+TLt/ft)/2<6.0$$

is preferably satisfied.

In the above method, where the total length of the zoom lens in a wide-angle end state is defined as TLw, the total length of the zoom lens in a telephoto end state is defined as TLt, and a focal length of the zoom lens in the wide-angle end state is defined as fw, the condition of the following expression $$3.0<(TLw/fw+TLt/fw)/2<10.0$$

is preferably satisfied.

ADVANTAGEOUS EFFECTS OF THE INVENTION

The present invention makes it possible to further miniaturize a zoom lens.

Further scope of applicability of the present invention will become apparent from the detailed description given hereinafter. However, it should be understood that the detailed description and specific examples, while indicating preferred examples of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EXAMPLES

Figure 21:
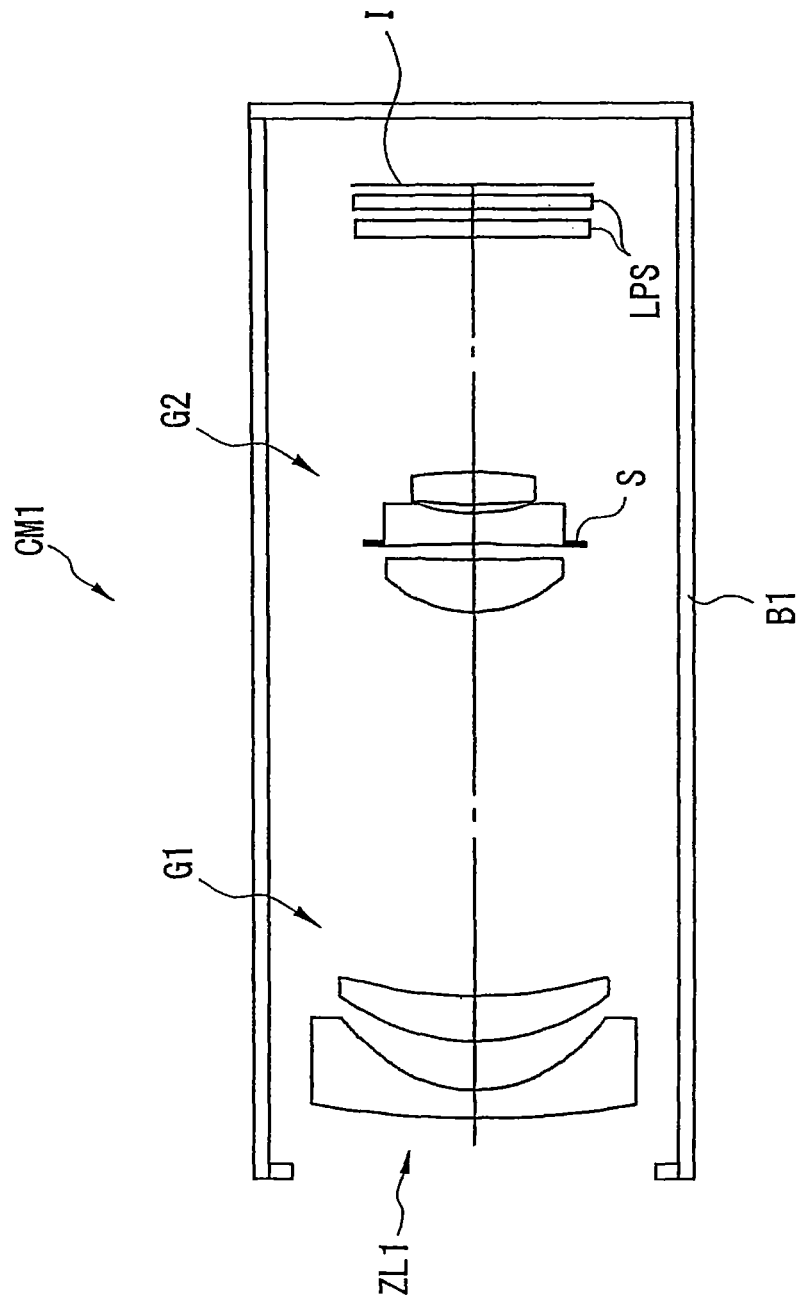
FIG. 21 is a schematic constitutional view of the digital still camera according to Example 1.

Preferred examples of the present invention will be described hereinbelow with reference to the drawings. A digital still camera CM1 which comprises a zoom lens ZL1 according to Example 1 is shown in FIG. 21. This digital still camera CM1 comprises a zoom lens ZL1 that forms an image of a photographic object (object) on an imaging surface I and a solid-state image pickup apparatus (not shown) which is provided on the imaging surface I, the zoom lens ZL1 and solid-state image pickup apparatus being built into the camera main body B1. A lowpass filter LPS which cuts off spatial frequencies at or above the limit resolution of the image pickup apparatus is provided between the zoom lens ZL1 and imaging surface I.

The zoom lens ZL1 comprises a first lens group G1 which has negative refractive power and a second lens group G2 which has positive refractive power and is disposed to an image side of the first lens group. Further, during zooming (varying a focal length) from the wide-angle end to the telephoto end, the first lens group G1 and the second lens group G2 move along an optical axis such that the distance between the first lens group G1 and the second lens group G2 decreases.

In the zoom lens ZL1 which is constituted in this manner, where the refractive index average value of the lens components which constitute the zoom lens is defined as ndav and the refractive index average value of the lens components which constitute the first lens group G1 is defined as ndGlav, the conditions expressed by the following conditional expressions (1) and (2) are preferably fulfilled.

$$ndav \geq 1.80 \quad (1)$$

$$ndGlav \geq 1.85 \quad (2)$$

By satisfying the conditions expressed by the conditional expressions (1) and (2), a high image formation performance can be obtained with a compact constitution and the zoom lens and the optical apparatus (digital still camera CM1) that comprises the zoom lens can be further miniaturized. In the case of an optical apparatus such as a digital still camera or a video camera that comprises a solid-state image pickup apparatus such as a CCD, considerable results can be obtained with an optical apparatus which has a zoom ratio on the order of 2.5 to 3 times.

Conditional expression (1) prescribes a refractive index average value for all the lens components which constitute the zoom lens. Here, the refractive index average value is a lens-component refractive index average value and the refractive index of the lowpass filter is not factored into the average value. When the optical system as a whole is to be reduced and in cases where ndav is lower than the lower limit value of conditional expression (1), the radius of curvature of each lens component is reduced and fabrication is then extremely difficult. In addition, because it is also difficult to hold the lens itself, the lens center thickness must be increased in order to make it easy to hold the lens, and miniaturization is problematic. Furthermore, because the radius of curvature is reduced, it is difficult to favorably correct lateral chromatic aberration, coma aberration, and spherical aberration, which is disadvantageous. The lower limit value of conditional expression (1) is more preferably 1.82.

Conditional expression (2) satisfies the refractive index average value of the lens components which constitute the first lens group G1 disposed closest to the object. In cases where ndGlav is lower than the lower limit value of conditional expression (2), the radius of curvature of the lens components which constitute the first lens group G1 is reduced and the lens interferes with other parts when the lens barrel is housed. It is therefore difficult to reduce the size of the lens in the housed state. Furthermore, because the radius of curvature is reduced, it is difficult to favorably correct distortion, astigmatism, and lateral chromatic aberration, which is disadvantageous. The lower limit value of conditional expression (2) is more preferably 1.86 and more preferably 1.90.

In addition, the refractive index average value of conditional expression (2) is a lens-component refractive index average value and the refractive index of optical elements other than lens components such as prisms or the like is not factored into the average value. However, a refractive index average value of optical members which constitute the first lens group G1 (including the optical element and lens components) is preferably at least 1.85 and more preferably equal to or more than 1.86 from the standpoint of miniaturization of the zoom lens. In cases where the optical apparatus comprises an optical element such as a prism that bends the path of light, the optical element is preferably provided in the first lens group. In this case, the zoom lens can be suitably miniaturized.

In addition, in the case of such a zoom lens ZL1, the first lens group G1 preferably comprises a plurality of lens components. In this case, the fluctuations in the lateral chromatic aberration caused by zooming can be reduced.

Furthermore, the second lens group G2 which is disposed to the image side of the first lens group G1 preferably comprises a plurality of lens components. Thus, the fluctuations in the spherical aberrations and astigmatism caused by zooming can be reduced.

In addition, where the number of all the lens components which constitute the zoom lens is defined as GRn, the condition represented by conditional expression (3) below is preferably satisfied.

$$4 < GRn < 16 \quad (3)$$

Conditional expression (3) prescribes the number of all the lens components which constitute the zoom lens. In cases where GRn is lower than the lower limit value of conditional expression (3), because the number of lens components which constitute the respective lens groups is small, it is difficult to reduce the fluctuations in the lateral chromatic aberration, astigmatism, spherical aberration, and axial chromatic aberration which are caused by zooming. On the other hand, in cases where GRn is higher than the upper limit value of conditional expression (3), because there is a large number of lens components which constitute the respective lens groups, it is difficult to reduce the size when the optical apparatus is housed. It is also difficult to reduce the fluctuations in the lateral chromatic aberration caused by zooming.

In addition, the first lens group G1 preferably comprises a lens component which has an aspherical surface. Thus, the number of the lens components constituting each lens group can be reduced. In addition, the fluctuations in the coma aberration and astigmatism caused by zooming can be reduced.

In addition, where the total length of the zoom lens in a wide-angle end state is defined as TLw, the total length of the zoom lens in a telephoto end state is defined as TLt, a focal length of the zoom lens in the wide-angle end state is defined as fw, and a focal length of the zoom lens in the telephoto end state is defined as ft, the condition represented by conditional expression (4) below is preferably satisfied.

$$2.5 < (TLw/fw + TLt/ft)/2 < 6.0 \quad (4)$$

Conditional expression (4) prescribes the relationships between the TLw which is the total length of the zoom lens in a wide-angle end state, TLt which is the total length of the zoom lens in a telephoto end state, a focal length of the zoom lens in the wide-angle end state fw, and a focal length of the zoom lens in the telephoto end state ft. In cases where TLw/fw+TLt/ft is lower than the lower limit value of conditional expression (4), it is difficult to secure the distance between the respective lens groups and reducing the fluctuations in the lateral chromatic aberration, astigmatism, spherical aberration, and axial chromatic aberration which are caused by zooming is problematic. However, in cases where TLw/fw+TLt/ft is higher than the upper limit value of conditional expression (4), the total length of the optical system grows long and it is difficult to miniaturize the whole camera. In addition, it is difficult to reduce fluctuations in the lateral chromatic aberration caused by zooming. The lower limit value of conditional expression (4) is more preferably 3.5. In addition, the upper limit value of conditional expression (4) is more preferably 5.0.

In addition, where the total length of the zoom lens in a wide-angle end state is defined as TLw, the total length of the zoom lens in a telephoto end state is defined as TLt and a focal length of the zoom lens in the wide-angle end state is defined as fw, the condition represented by conditional expression (5) below is preferably fulfilled.

$$3.0 < (TLw/fw + TLt/fw)/2 < 10.0 \quad (5)$$

Conditional expression (5) prescribes the relationships between TLw, which is the total length of the zoom lens in a wide-angle end state, TLt, which is the total length of the zoom lens in a telephoto end state, and a focal length of the zoom lens in the wide-angle end state fw. In cases where TLw/fw+TLt/fw is lower than the lower limit value of the conditional expression (5), it is difficult to secure a distance between the respective lens groups and reducing the fluctuations in the lateral chromatic aberration, astigmatism, spherical aberration, and axial chromatic aberration which are caused by zooming is problematic. However, in cases where TLw/fw+TLt/fw is higher than the upper limit value of conditional expression (5), the total length of the optical system grows long and it is difficult to miniaturize the whole camera. It is also difficult to reduce the fluctuations in the lateral chromatic aberration caused by zooming. The lower limit value of conditional expression (5) is more preferably 4.0. In addition, the upper limit value of conditional expression (5) is more preferably 8.0.

In addition, as mentioned earlier, the first lens group G1 has negative refractive power. Furthermore, the plurality of lens groups which constitute the zoom lens ZL1 are constituted by the first lens group G1 and the second lens group G2 with positive refractive power and is disposed to an image side of the first lens group. With such a constitution, zoom lens ZL1 can be suitably miniaturized.

Here, where the total length of the zoom lens in a wide-angle end state is defined as TLw, the total length of the zoom lens in a telephoto end state is defined as TLt, and a focal length of the zoom lens in the telephoto end state is defined as ft, the condition represented by conditional expression (6) below is preferably satisfied.

$$1.0 < (TLw/ft + TLt/ft)2 < 2.0 \quad (6).$$

Conditional expression (6) prescribes the relationships between the TLw, which is the total length of the zoom lens in a wide-angle end state, TLt, which is the total length of the zoom lens in a telephoto end state, and a focal length of the zoom lens in the telephoto end state ft. In cases where TLw/ft+TLt/ft is lower than the lower limit value of the conditional expression (6), it is difficult to secure a distance between the respective lens groups and reducing the fluctuations in the lateral chromatic aberration, astigmatism, spherical aberration, and axial chromatic aberration which are caused by zooming is problematic. However, in cases where TLw/ft+TLt/ft is higher than the upper limit value of conditional expression (6), the total length of the optical system grows long and it is difficult to miniaturize the whole camera. It is also difficult to reduce the fluctuations in the lateral chromatic aberration caused by zooming. The lower limit value of conditional expression (6) is more preferably 1.4. In addition, the upper limit value of conditional expression (6) is more preferably 1.9.

Figure 22:
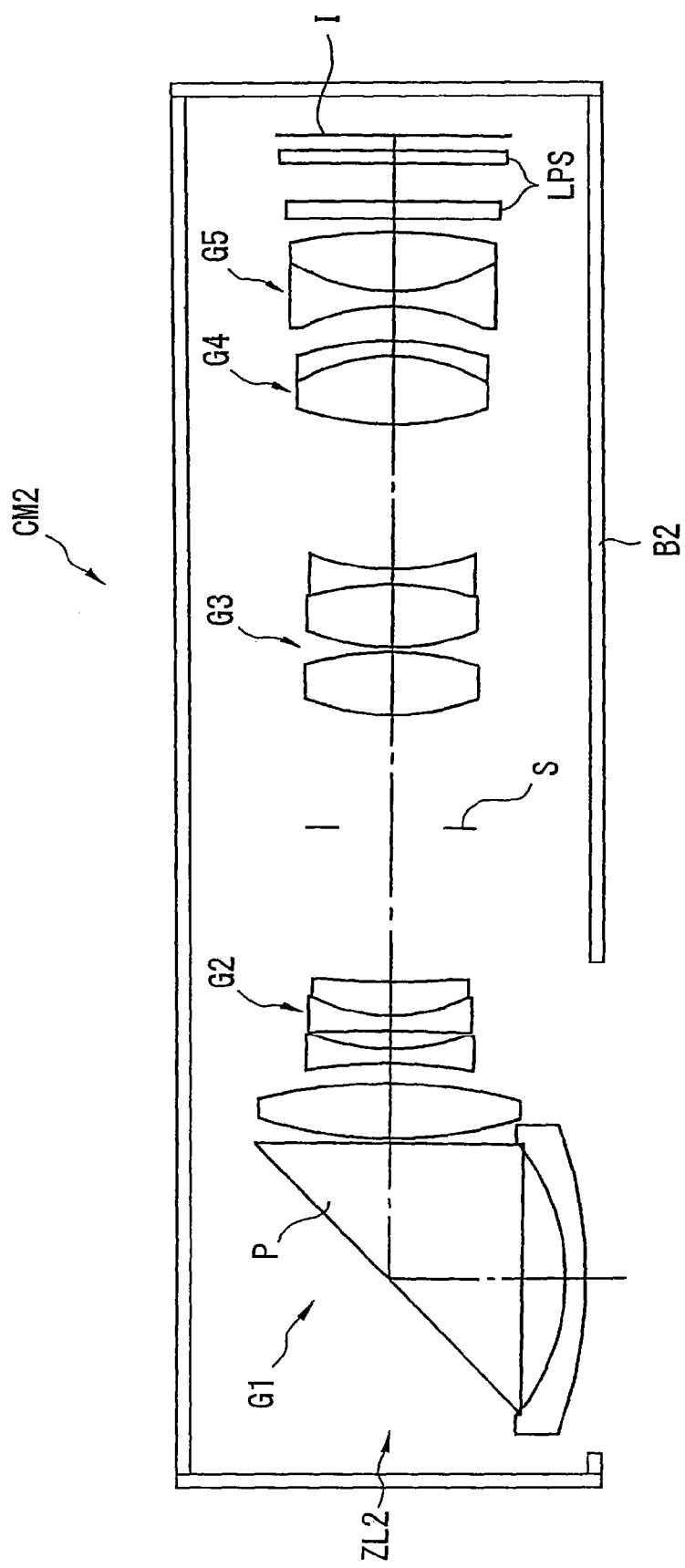
FIG. 22 is a schematic constitutional view of the digital still camera according to Example 2.

The first lens group G1 may also have a positive refractive power. Example 2 of the zoom lens will therefore be described hereinbelow. A digital still camera CM2 which comprises a zoom lens ZL2 according to Example 2 is shown in FIG. 22. The digital still camera CM2 according to Example 2 comprises a zoom lens ZL2 which forms an image of the photographic object (object) on the imaging surface I and a solid-state image pickup apparatus (not shown) which is disposed on the imaging surface I, the zoom lens ZL2 and a solid-state image pickup apparatus being built into a camera main body B2. A lowpass filter LPS which cuts off spatial frequencies at or above the limit resolution of the image pickup apparatus is disposed between the zoom lens ZL2 and imaging surface I.

The zoom lens ZL2 of Example 2 comprises, in order from the object, a first lens group G1 which has positive refractive power, a second lens group G2 which has negative refractive power, a third lens group G3 which has positive refractive power, a fourth lens group G4 which has positive refractive power, and a fifth lens group G5 which has negative refractive power. Further, during zooming (varying a focal length) from the wide-angle end to the telephoto end, the second lens group G2 and the fourth lens group G4 move along the optical axis, and the first lens group G1, the third lens group G3, and the fifth lens group G5 are fixed to the imaging surface I.

The same effects as those of Example 1 can also be obtained with the zoom lens ZL2 so constituted by satisfying the condition represented by conditional expression (1) and the conditional expression (2). In addition, by satisfying the condition represented by conditional expression (3), the same effects as in the case of Example 1 can be obtained. Likewise, by satisfying the condition represented by conditional expression (4), the same effects as in the case of Example 1 can be obtained. Similarly, by satisfying the condition represented by the conditional expression (5), the same effects as in the case of Example 1 can be obtained.

So too in the case of the zoom lens ZL2 of Example 2, the first lens group G1 preferably comprises a plurality of lens components. Thus, the fluctuations in the lateral chromatic aberration caused by the zooming can be reduced.

In addition, the second lens group G2 that is disposed to an image side of the first lens group G1 preferably comprises a plurality of lens components. Thus, the fluctuations in the spherical aberration and astigmatism caused by zooming can be reduced.

In addition, the first lens group G1 preferably comprises a lens component which has an aspherical surface. Thus, the number of lens components which constitute the respective lens groups can be reduced. The fluctuations in the coma aberration and astigmatism caused by zooming can also be reduced.

As mentioned earlier, in the zoom lens ZL2 of Example 2, the first lens group G1 has positive refractive power. In addition, the plurality of lens groups which constitute the zoom lens ZL2 comprises, in order from the object, the first lens group G1, the second lens group G2 which has negative refractive power, the third lens group G3 which has positive refractive power, the fourth lens group G4 which has positive refractive power, and the fifth lens group G5 which has negative refractive power. With such a constitution, the zoom lens ZL2 can be suitably miniaturized.

As per the zoom lens ZL2 of Example 2, an optional surface of the plurality of lens groups with positive refractive power from the first lens group G1 may be a diffractive surface. In addition, an optional lens in the plurality of lens groups with positive refractive power from the first lens group G1 may be a refractive index distribution lens (GRIN lens) or a plastic lens.

Example 1

Figure 1:
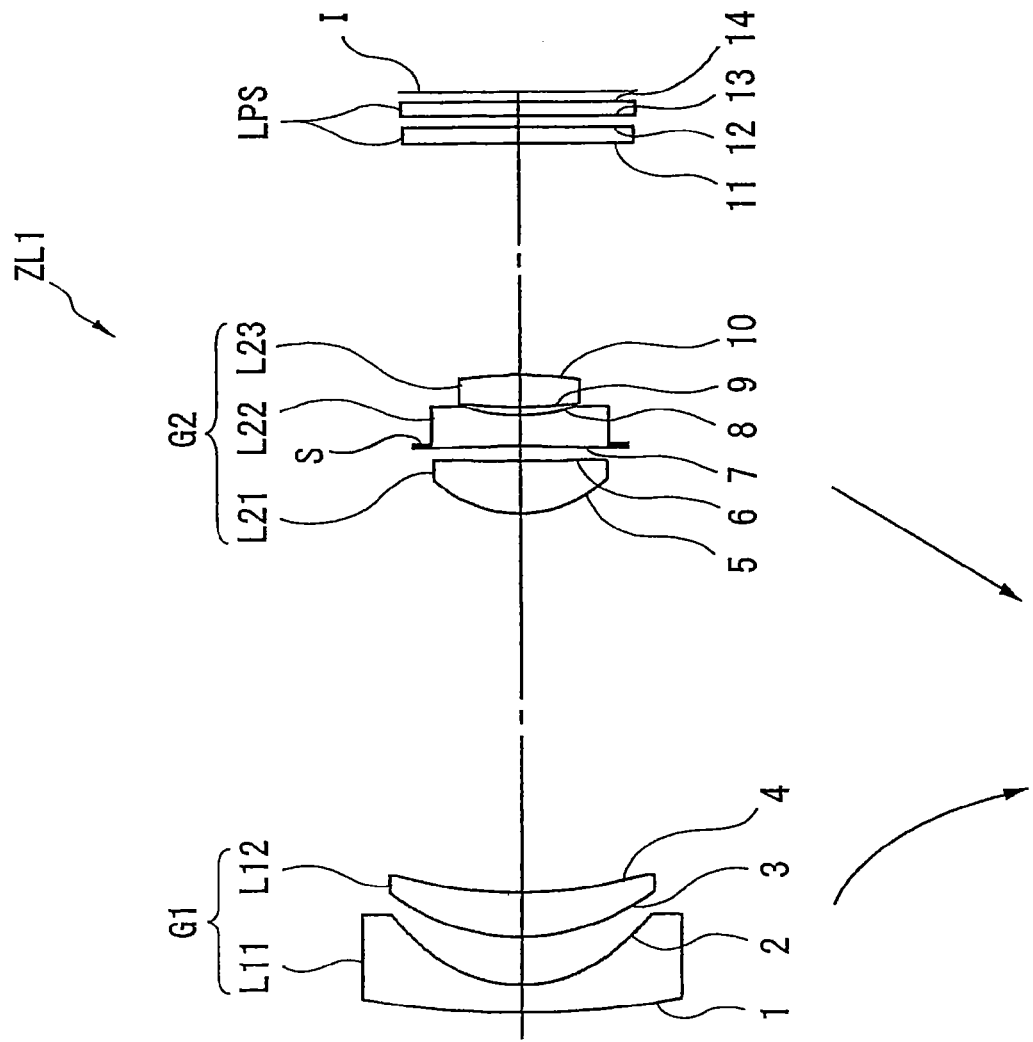
FIG. 1 is a lens constitutional view of a zoom lens according to Example 1.

Example 1 of this specification will now be described using FIGS. 1 to 4 and Table 1. FIG. 1 is a lens constitutional view of the zoom lens according to Example 1. The zoom lens ZL1 according to Example 1 has the same constitution as that of the zoom lens ZL1 of the preferred example and, as mentioned earlier, comprises the first lens group G1 which has negative refractive power, and the second lens group G2 which has positive refractive power and is disposed to an image side of the first lens group. Further, during zooming (varying a focal length) from the wide-angle end to the telephoto end, the first lens group G1 and the second lens group G2 move along an optical axis such that a distance between the first lens group G1 and the second lens group G2 decreases.

The first lens group G1 comprises, in order from the object, a negative meniscus lens L11 having a convex surface facing the object and a positive meniscus lens L12 having a convex surface facing the object. The second lens group G2 comprises, in order from the object, a positive meniscus lens L21 having a convex surface facing the object, a two-sided concave shape negative lens L22, and a two-sided convex shape positive lens L23.

An aperture stop S is disposed on the curved surface which is the object side surface of the negative lens L22 of the second lens group G2. In addition, a lowpass filter LPS is disposed between the second lens group G2 and an imaging surface I.

Table 1 below shows a numerical example of Example 1. In Table 1, during among 'All parameters', f represents a focal length, Bf represents a back focal length, FNo represents an f-number, and Ω represents a half angle of view. In addition, in 'Lens parameters', the surface number is the number of the lens surface counted from the object side, r is a radius of curvature of the lens surface, d is a distance to the next lens surface along the optical axis, v is an Abbe number, and n is a refractive index of the medium at d-line (wavelength λ=587.56 nm). '∞' indicates a plane surface and '1.000000', which is the refractive index of air, is omitted. Further, the surface numbers 1 to 14 in Table 1 correspond to the surfaces 1 to 14 in FIG. 1.

In addition, 'Aspherical surface data' shows the aspherical coefficient in a case where an aspherical surface is exhibited by the following expression. Here, X(y) represents a distance along the optical axis from the target surface at the vertex of the aspherical surface to the position on the aspherical surface at the height y; r is a radius of curvature of a reference spherical surface (paraxial radius of curvature), K is a conical coefficient, and Cn is an aspherical coefficient of nth-order (n=4, 6, 8, 10).

$$X(y)=y^2/[r\times\{1+(1-K\times y^2/r^2)^{1/2}\}]+C4\times y^4+C6\times y^6+C8\times y^8+C10\times y^{10}$$

In addition, the 'Zooming data' show values of a focal length and variable distances in the respective states of the wide-angle end, intermediate focal length, and telephoto end. Although 'mm' is generally used for the focal length f, the radius of curvature r, the distance to the next lens surface d which appear here and for other lengths where there is no particular mention among all the parameters hereinbelow. However, because the same optical performance is obtained even when the optical system is proportionally enlarged or proportionally reduced, the measurement units are not restricted to these units. That is, the measurement units are not restricted to 'mm' and other suitable units can also be employed. A description of the second to fifth examples will be omitted because the same reference numerals as those of this example are used therein.

TABLE 1

| [All parameters] |
|---|
| f = 5.87000 to 9.00000 to 16.60000 |
| Bf = 0.37000 |
| FNo = 2.91785 to 3.44437 to 4.84731 |
| ω = 34.34595 to 23.00975 to 12.73744 |

| [Lens parameters] | | | | | |
|---|---|---|---|---|---|
| Surface number | r | d | v | n | |
| 1 | 33.0398 | 1.0000 | 40.80 | 1.883000 | |
| 2 | 5.0228 | 1.7500 | | | (aspherical surface) |
| 3 | 7.8944 | 1.6000 | 23.78 | 1.846660 | |
| 4 | 16.5416 | D1 | | | |
| 5 | 4.6167 | 1.9000 | 53.31 | 1.693500 | |
| 6 | 312.8362 | 0.5500 | | | (aspherical surface) |
| 7 | −63.3312 | 1.1000 | 23.78 | 1.846660 | (aperture stop) |

TABLE 1-continued

| | | | | |
|---|---|---|---|---|
| 8 | 5.8710 | 0.3182 | | |
| 9 | 19.4102 | 1.1500 | 40.73 | 1.806100 |
| 10 | −12.8483 | D2 | | |
| 11 | ∞ | 0.6000 | 64.20 | 1.516800 |
| 12 | ∞ | 0.4000 | | |
| 13 | ∞ | 0.5000 | 64.20 | 1.516800 |
| 14 | ∞ | Bf | | |

[Aspherical surface data]

| Surface number | K | C4 | C6 | C8 | C10 |
|---|---|---|---|---|---|
| 2 | 0.1739 | $4.19490 \times 10^{-4}$ | $1.79260 \times 10^{-6}$ | $1.65300 \times 10^{-7}$ | $-2.25210 \times 10^{-9}$ |
| 6 | 1.0000 | $9.63780 \times 10^{-4}$ | $5.57530 \times 10^{-6}$ | $-1.00140 \times 10^{-5}$ | $7.29920 \times 10^{-7}$ |

[Zooming data]

| | Wide-angle end | Intermediate focal length | Telephoto end |
|---|---|---|---|
| f | 5.87000 | 9.00000 | 16.60000 |
| D0 | ∞ | ∞ | ∞ |
| D1 | 13.76317 | 6.65535 | 0.55246 |
| D2 | 8.40924 | 10.66575 | 16.14482 |

[Conditional expressions]

| | |
|---|---|
| Conditional expression (1) | ndav = 1.81518 |
| Conditional expression (2) | ndG1av = 1.86483 |
| Conditional expression (3) | GRn = 5 |
| Conditional expression (4) | (TLw/fw + TLt/ft)/2 = 3.68731 |
| Conditional expression (5) | (TLw/fw + TLt/fw)/2 = 5.22540 |
| Conditional expression (6) | (TLw/ft + TLt/ft)/2 = 1.84778 |

Thus, it is clear that the above conditional expressions (1) to (6) are all satisfied by this example.

Figure 2:
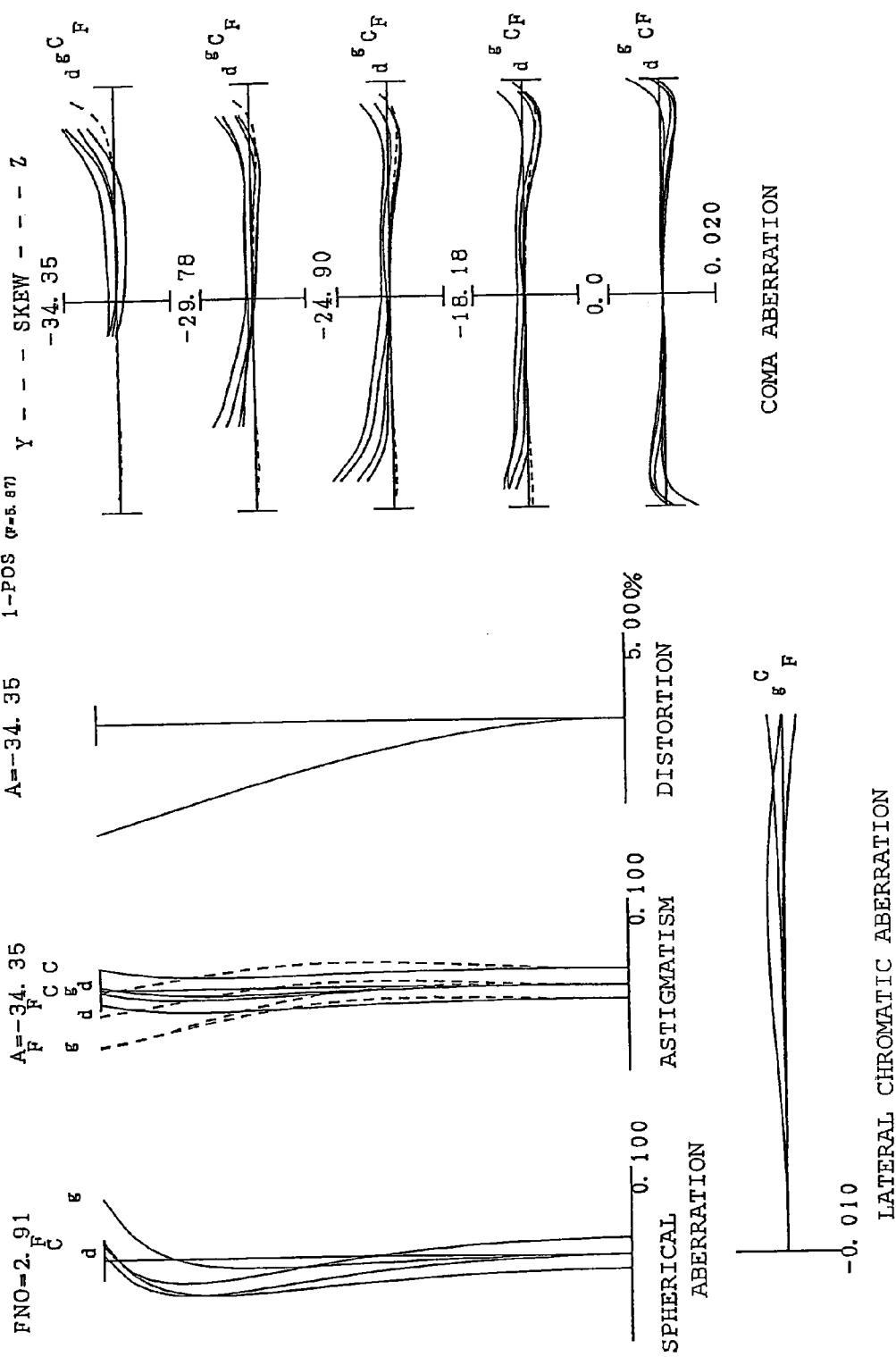
FIG. 2 is a graph showing various aberrations of the zoom lens according to Example 1 upon focusing on infinity in the wide-angle end state.
Figure 3:
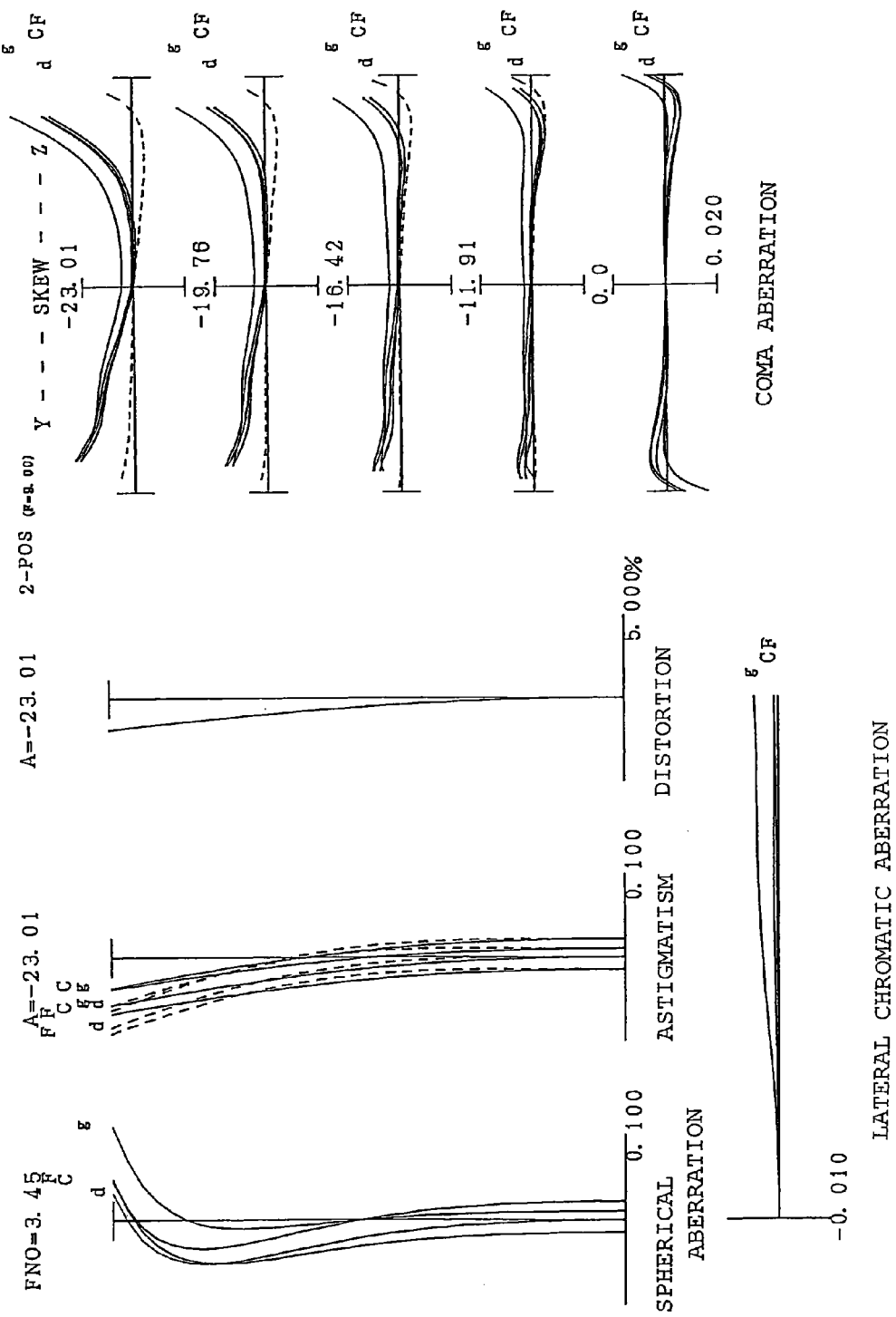
FIG. 3 is a graph showing various aberrations of the zoom lens according to Example 1 upon focusing on infinity in the intermediate focal length state.
Figure 4:
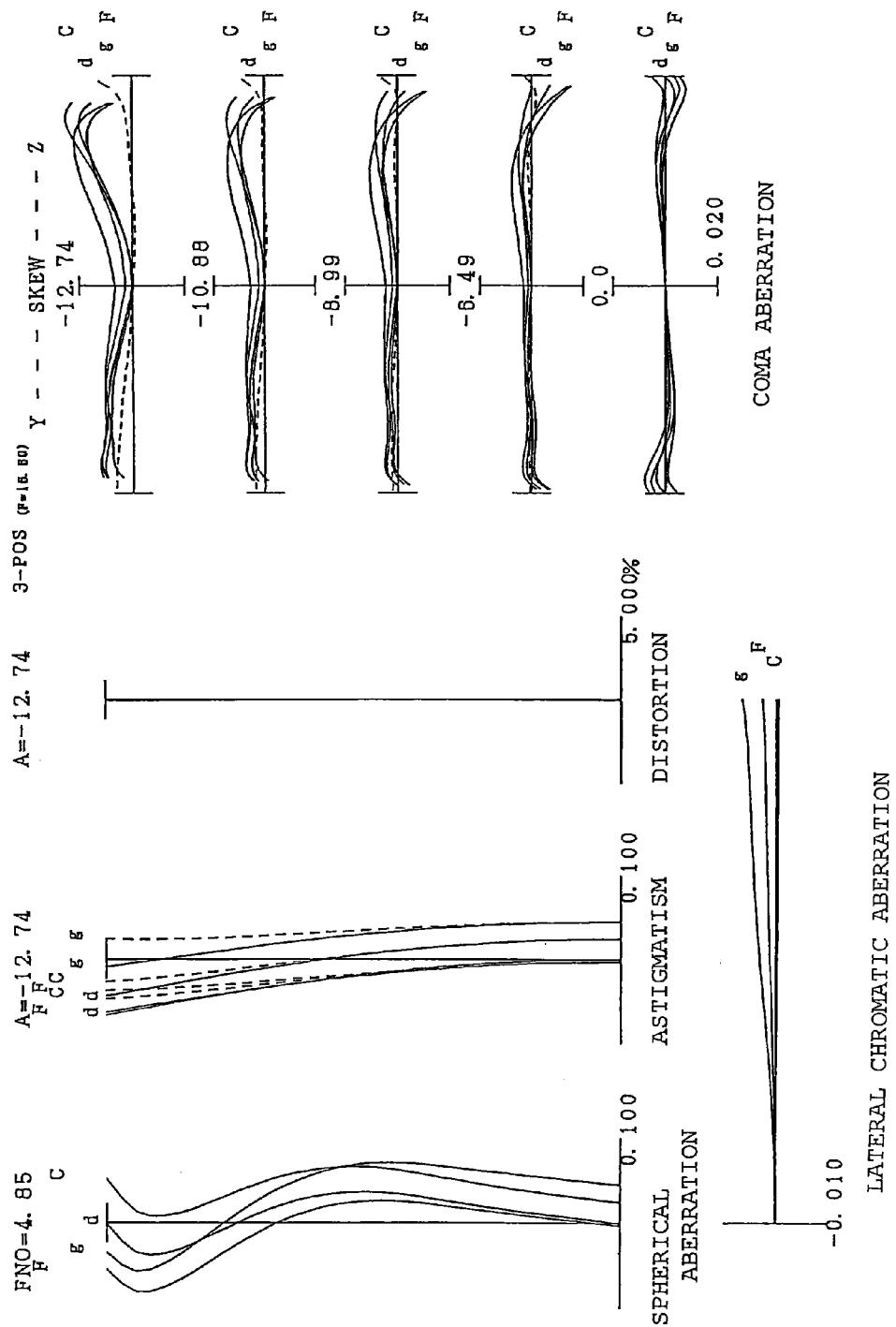
FIG. 4 is a graph showing various aberrations of the zoom lens according to Example 1 upon focusing on infinity in the telephoto end state.

FIGS. 2, 3, and 4 are graphs showing respectively various aberrations of the zoom lens upon focusing on infinity in the wide-angle end state, various aberrations of the zoom lens upon focusing on infinity in the intermediate focal length state, and various aberrations of the zoom lens upon focusing on infinity in the telephoto end state, according to Example 1. In each of these aberration graphs, FNO represents an f-number, A represents a half angle of view, d is d-line (wavelength λ=587.6 nm), g is g-line (wavelength λ=435.6 nm), C is C-line (wavelength λ=656.3 nm), and F represents F-line (wavelength λ=486.1 nm). Further, in the astigmatism graph, the solid line indicates the sagittal image surface and the broken line indicates the meridional imaging surface. The description of the aberration graph is the same for the other examples and, therefore, a description has been omitted for the second to fifth examples. As is shown in the respective aberration graphs, it is clear that the various aberrations are favorably corrected for the zoom lens ZL1 according to Example 1.

Example 2

Figure 5:
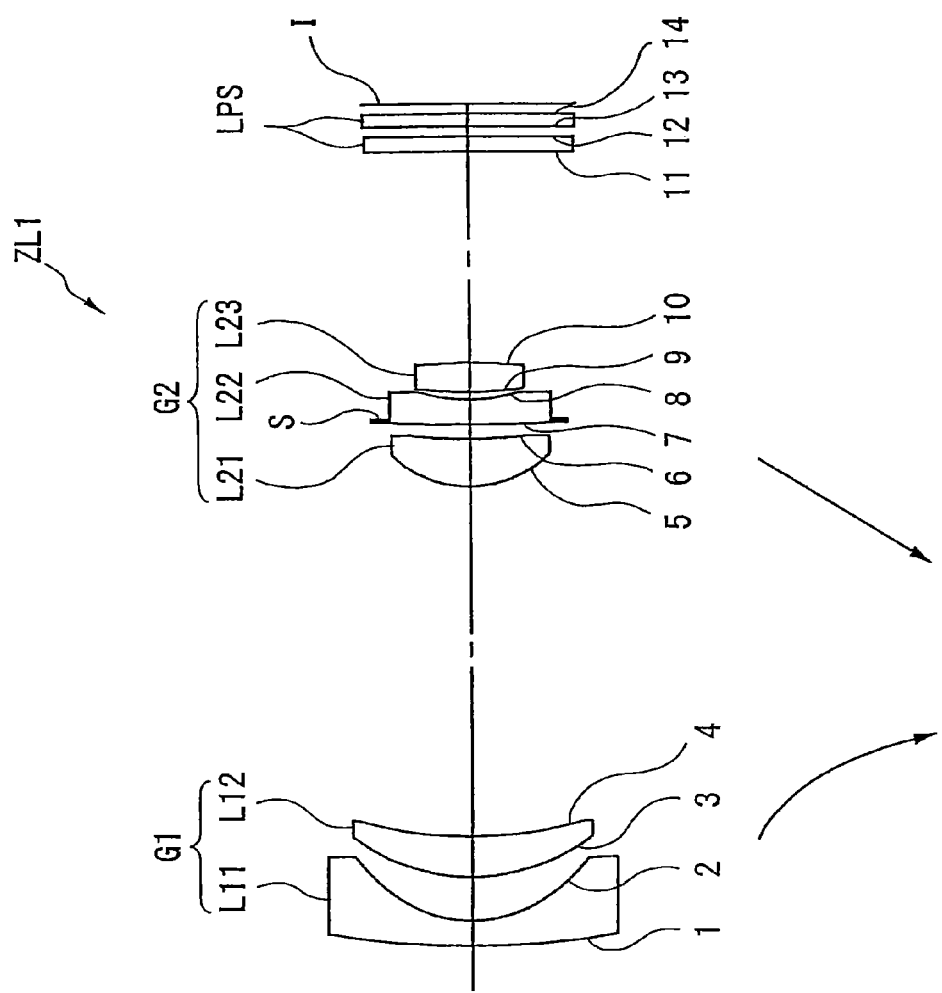
FIG. 5 is a lens constitutional view of a zoom lens according to Example 2.

Example 2 of the present invention will be described hereinbelow with reference to FIGS. 5 to 8 and Table 2. FIG. 5 is a lens constitutional view of the zoom lens according to Example 2. The zoom lens ZL1 of Example 2 has the same constitution as that of the zoom lens ZL1 of Example 1 except for the constitution of the second lens group and a detailed description is omitted by assigning the same reference numerals to the respective parts as in the case of Example 1. The second lens group G2 of Example 2 comprises, in order from the object, a positive meniscus lens L21 having a convex surface facing the object, a negative meniscus lens L22 having a convex surface facing the object, and a two-sided convex shape positive lens L23. In addition, an aperture stop S is disposed on the curved surface which is the object side surface of the negative meniscus lens L22 of the second lens group G2.

Table 2 below shows the parameters of the respective lenses of the Example 2. The surface numbers 1 to 14 of Table 2 correspond to the surfaces 1 to 14 in FIG. 5.

TABLE 2

[All parameters]

f = 5.87000 to 9.00000 to 16.60000
Bf = 0.37000
FNo = 2.93599 to 3.47216 to 4.90927
ω = 34.34533 to 23.00966 to 12.73751

[Lens parameters]

| Surface number | r | d | ν | n | |
|---|---|---|---|---|---|
| 1 | 33.0794 | 1.0000 | 40.80 | 1.883000 | |
| 2 | 5.0161 | 1.7500 | | | (aspherical surface) |
| 3 | 7.8804 | 1.6000 | 23.78 | 1.846660 | |

TABLE 2-continued

| | | | | | |
|---|---|---|---|---|---|
| 4 | 16.5416 | D1 | | | |
| 5 | 4.4755 | 1.9000 | 53.31 | 1.693500 | |
| 6 | 24.0524 | 0.5500 | | | (aspherical surface) |
| 7 | 51.4019 | 1.0000 | 20.88 | 1.922860 | (aperture stop) |
| 8 | 6.7080 | 0.3200 | | | |
| 9 | 18.6080 | 1.1500 | 40.73 | 1.806100 | |
| 10 | −17.8934 | D2 | | | |
| 11 | ∞ | 0.6000 | 64.20 | 1.516800 | |
| 12 | ∞ | 0.4000 | | | |
| 13 | ∞ | 0.5000 | 64.20 | 1.516800 | |
| 14 | ∞ | Bf | | | |

[Aspherical surface data]

| Surface number | K | C4 | C6 | C8 | C10 |
|---|---|---|---|---|---|
| 2 | 0.1750 | $4.19880 \times 10^{-4}$ | $1.28140 \times 10^{-6}$ | $2.14520 \times 10^{-7}$ | $-3.57350 \times 10^{-9}$ |
| 6 | 1.0000 | $8.22630E \times 10^{-4}$ | $1.00060 \times 10^{-5}$ | $-9.91530 \times 10^{-6}$ | $5.44200 \times 10^{-7}$ |
| 10 | 23.7382 | $1.82960 \times 10^{-3}$ | $7.60710 \times 10^{-5}$ | $3.45900 \times 10^{-5}$ | $-8.75540 \times 10^{-7}$ |

[Zooming data]

| | Wide-angle end | Intermediate focal length | Telephoto end |
|---|---|---|---|
| f | 5.87000 | 9.00000 | 16.60000 |
| D0 | ∞ | ∞ | ∞ |
| D1 | 13.92570 | 6.81788 | 0.71499 |
| D2 | 8.42315 | 10.67966 | 16.15873 |

[Conditional expressions]

| | |
|---|---|
| Conditional expression (1) | ndav = 1.83042 |
| Conditional expression (2) | ndG1av = 1.86483 |
| Conditional expression (3) | GRn = 5 |
| Conditional expression (4) | (TLw/fw + TLt/ft)/2 = 3.69633 |
| Conditional expression (5) | (TLw/fw + TLt/fw)/2 = 5.23872 |
| Conditional expression (6) | (TLw/ft + TLt/ft)/2 = 1.85249 |

Thus, it is clear that the above conditional expressions (1) to (6) are all satisfied by this example.

Figure 6:
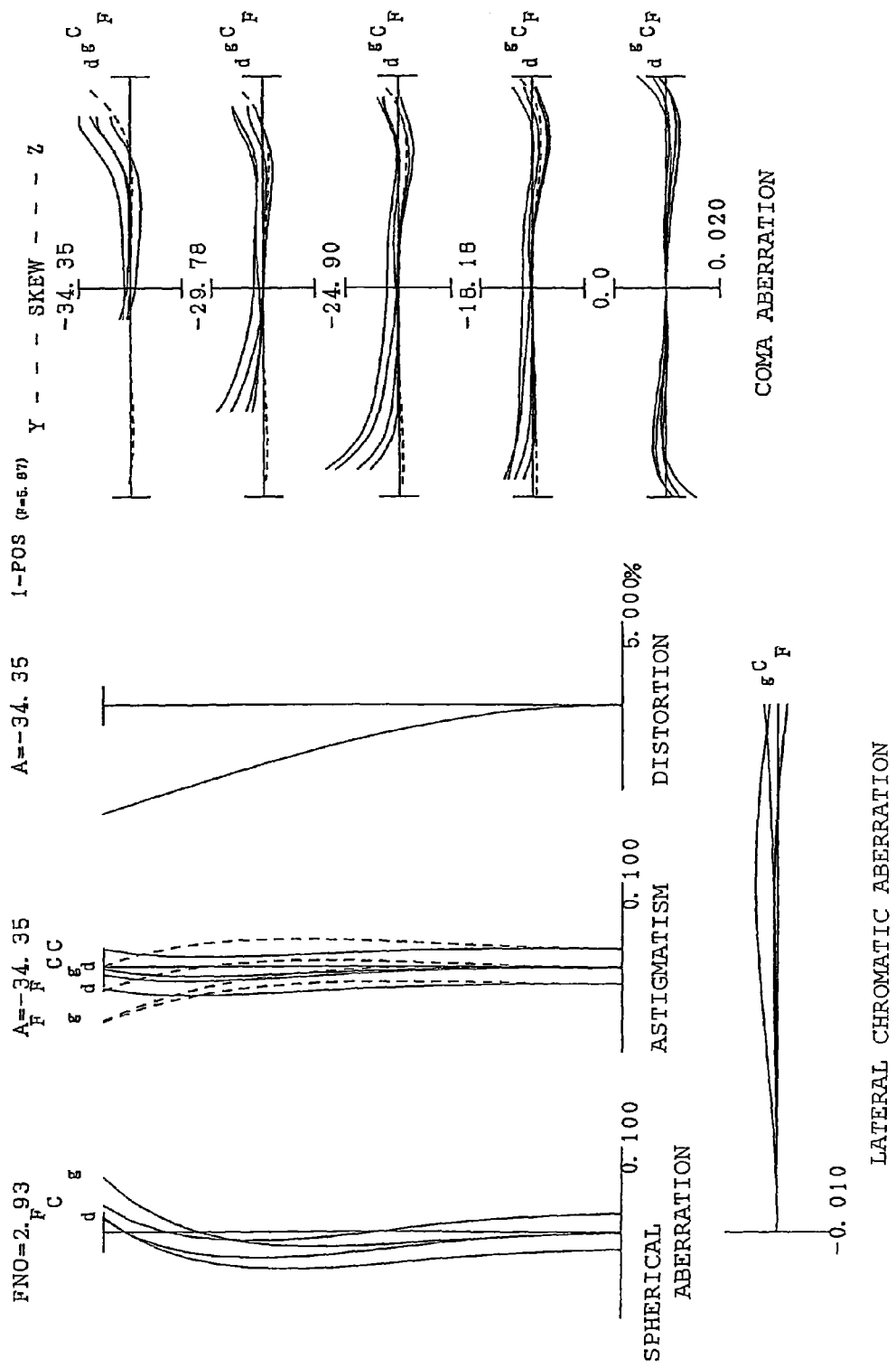
FIG. 6 is a graph showing various aberrations of the zoom lens according to Example 2 upon focusing on infinity in the wide-angle end state.
Figure 7:
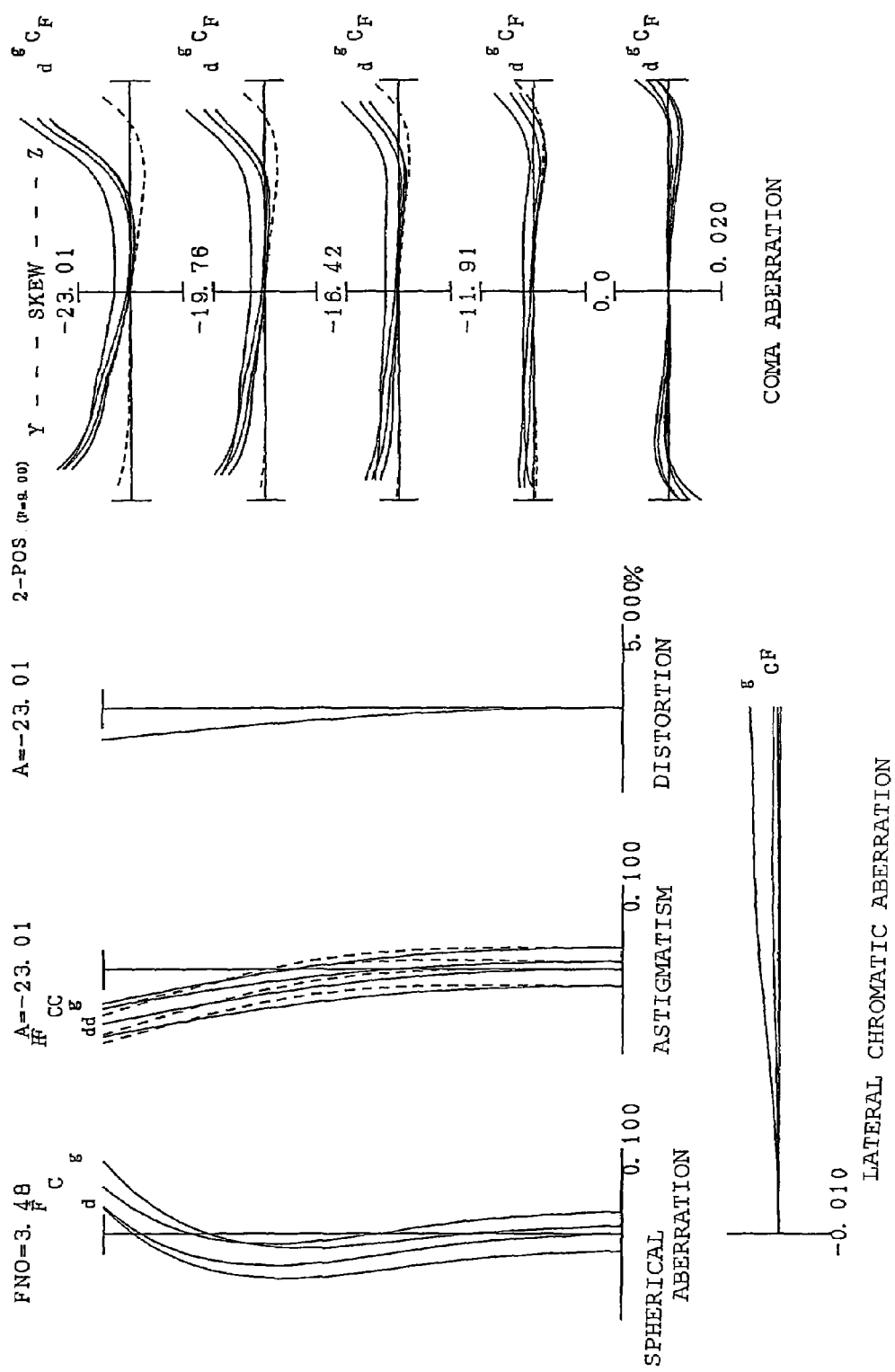
FIG. 7 is a graph showing various aberrations of the zoom lens according to Example 2 upon focusing on infinity in the intermediate focal length state.
Figure 8:
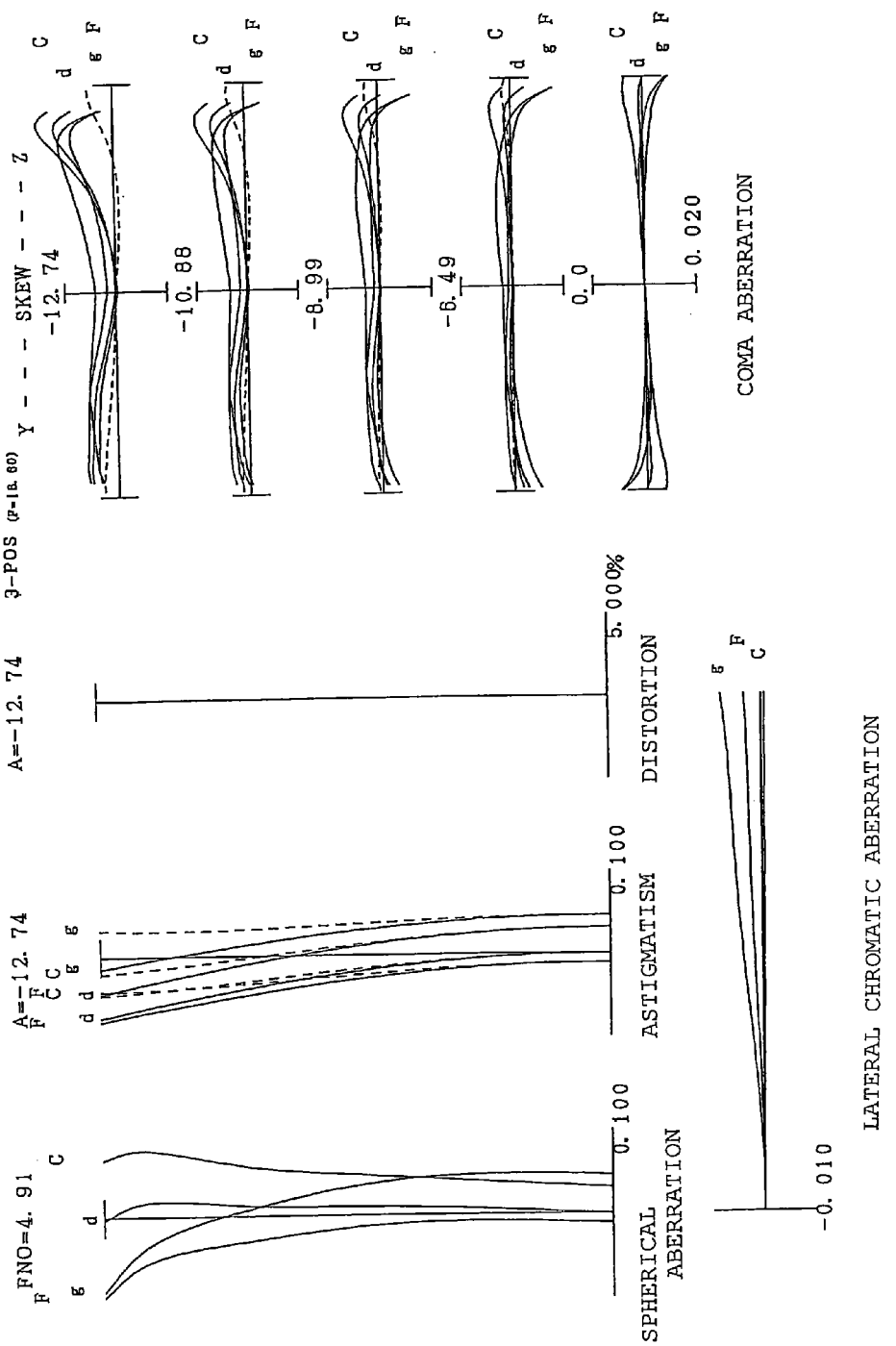
FIG. 8 is a graph showing various aberrations of the zoom lens according to Example 2 upon focusing on infinity in the telephoto end state.

FIGS. 6, 7, and 8 are graphs showing respectively various aberrations of the zoom lens upon focusing on infinity in the wide-angle end state, various aberrations of the zoom lens upon focusing on infinity in the intermediate focal length state, and various aberrations of the zoom lens upon focusing on infinity in the telephoto end state, according to Example 2. Further, as is shown in the respective aberration graphs, it is clear that the various aberrations are favorably corrected for the zoom lens ZL1 according to Example 2.

Example 3

Figure 9:
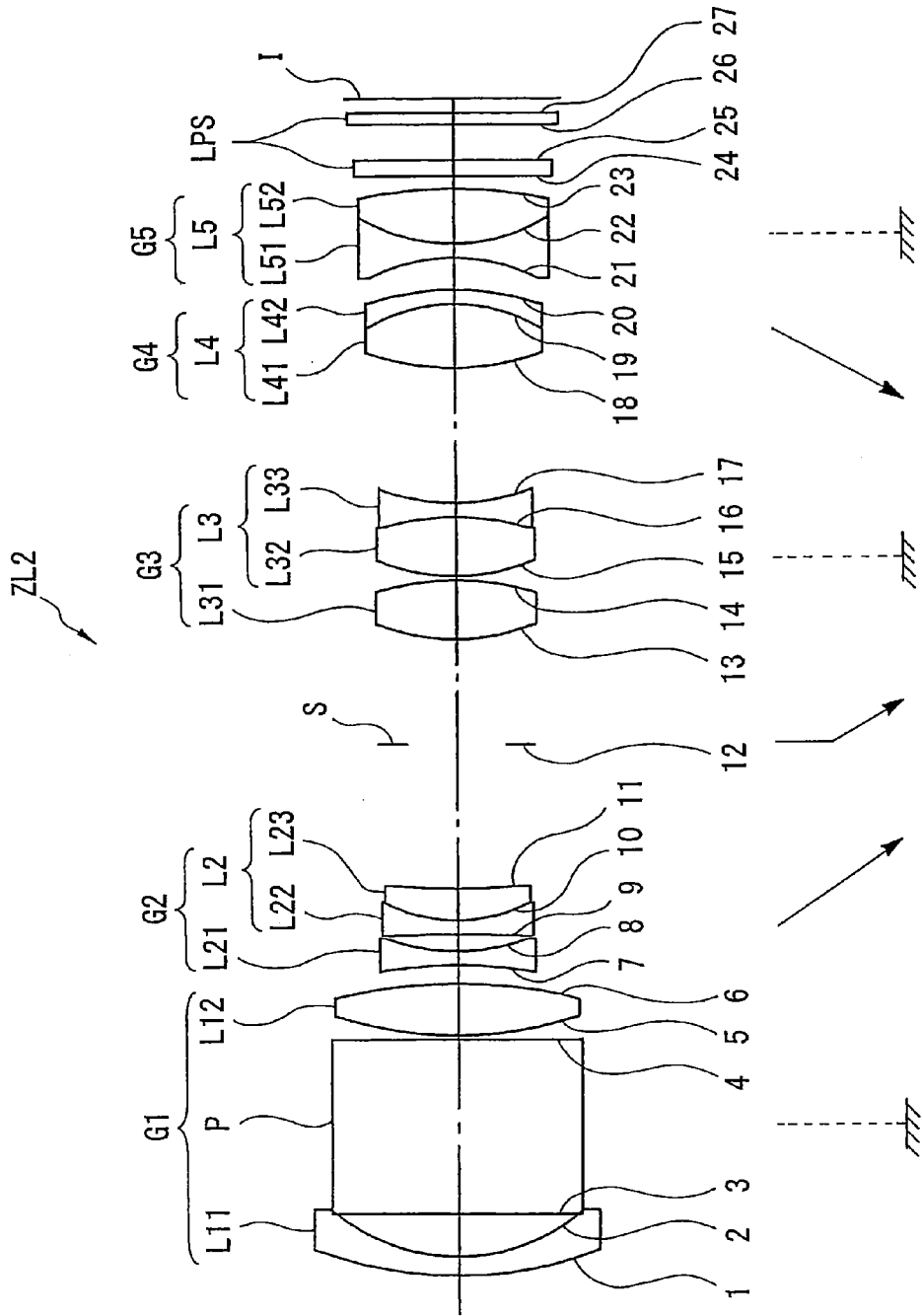
FIG. 9 is a lens constitutional view of the zoom lens according to Example 3.

Example 3 of the present invention will be described hereinbelow using FIGS. 9 to 12 and Table 3. FIG. 9 is a lens constitutional view of the zoom lens according to Example 3. The zoom lens ZL2 of Example 3 has the same constitution as that of the zoom lens ZL2 of Example 2 and, as mentioned earlier, comprises, in order from the object, a first lens group G1 which has positive refractive power, a second lens group G2 which has negative refractive power, a third lens group G3 which has positive refractive power, a fourth lens group G4 which has positive refractive power, and a fifth lens group G5 which has negative refractive power. Further, during zooming (varying a focal length) from the wide-angle end to the telephoto end, the second lens group G2 and the fourth lens group G4 move along an optical axis, and the first lens group G1, the third lens group G3, and the fifth lens group G5 are fixed to the imaging surface I. Further, the zoom lens ZL2 of Example 3 is constituted to bend the path of light through 90 degrees and is shown expanded in FIG. 9.

The first lens group G1 comprises, in order from the object, a negative meniscus lens L11 having a convex surface facing the object, a right-angled prism P for bending the path of light through 90 degrees, and a two-sided convex shape positive lens L12. The second lens group G2 comprises, in order from the object, a two-sided concave shape negative lens L21, and a cemented lens L2 made by joining a two-sided concave shape negative lens L22 and a positive meniscus lens L23 having a convex surface facing the object. The third lens group G3 comprises, in order from the object, a two-sided convex shape positive lens L31 and a cemented lens L3 made by joining a two-sided convex shape positive lens L32 and a two-sided concave shape negative lens L33.

The fourth lens group G4 comprises, in order from the object, a cemented lens L4 made by joining a two-sided convex shape positive lens L41 and a negative meniscus lens L42 having a convex surface facing the imaging surface. The fifth lens group G5 comprises, in order from the object, a cemented lens L5 which is made by joining a two-sided concave shape negative lens L51 and a two-sided convex shape positive lens L52. An aperture stop S is disposed in the vicinity of the lens which is closest to the object in the third lens group G3 and, when zooming from the wide-angle end to the telephoto end, the aperture stop S is fixed from the wide-angle end to the intermediate focal length but subsequently moves together with the second lens group G2 from the intermediate focal length to the telephoto end. Further, the abovementioned lowpass filter LPS is disposed between the fifth lens group G5 and imaging surface I.

Table 3 below shows the parameters of the respective lenses of Example 3. The surface numbers 1 to 27 in Table 3 correspond to the surfaces 1 to 27 in FIG. 9.

TABLE 3

[All parameters]

f = 6.94220 to 12.00076 to 19.61658
Bf = 0.59948
FNo = 3.71987 to 3.53689 to 4.69559
ω = 31.91337 to 18.62619 to 11.46372

[Lens parameters]

| Surface number | r | d | ν | n | |
|---|---|---|---|---|---|
| 1 | 17.4312 | 0.8000 | 25.46 | 2.000690 | |
| 2 | 8.2354 | 1.8000 | | | |
| 3 | ∞ | 7.4000 | 25.46 | 2.000690 | |
| 4 | ∞ | 0.2000 | | | |
| 5 | 15.7128 | 2.2000 | 49.23 | 1.768020 | (aspherical surface) |
| 6 | −23.9370 | D1 | | | (aspherical surface) |
| 7 | −19.1760 | 0.6000 | 52.32 | 1.755000 | |
| 8 | 8.9392 | 0.7100 | | | |
| 9 | −80.9570 | 0.6000 | 52.32 | 1.755000 | |
| 10 | 6.6255 | 1.3500 | 25.46 | 2.000690 | |
| 11 | 27.8470 | D2 | | | |
| 12 | ∞ | D3 | | | (aperture stop) |
| 13 | 8.2898 | 2.5000 | 59.44 | 1.583130 | (aspherical surface) |
| 14 | −11.8097 | 0.2000 | | | (aspherical surface) |
| 15 | 8.8076 | 2.5000 | 56.05 | 1.568829 | |
| 16 | −10.7395 | 0.6000 | 31.31 | 1.903660 | |
| 17 | 8.9118 | D4 | | | |
| 18 | 10.6467 | 2.7000 | 67.05 | 1.592010 | (aspherical surface) |
| 19 | −7.2329 | 0.6000 | 25.46 | 2.000690 | |
| 20 | −11.9754 | D5 | | | |
| 21 | −8.0256 | 0.6000 | 25.46 | 2.000690 | |
| 22 | 7.6826 | 2.3000 | 17.98 | 1.945950 | |
| 23 | −20.0633 | 0.5528 | | | |
| 24 | ∞ | 0.6500 | 70.51 | 1.544370 | |
| 25 | ∞ | 1.5000 | | | |
| 26 | ∞ | 0.5000 | 64.10 | 1.516800 | |
| 27 | ∞ | Bf | | | |

[Aspherical surface data]

| Surface number | K | C4 | C6 | C8 | C10 |
|---|---|---|---|---|---|
| 5 | 1.0000 | −6.62010 × 10$^{-5}$ | −1.34460 × 10$^{-7}$ | 1.95030 × 10$^{-9}$ | 0.00000 |
| 6 | 1.0000 | −8.60100 × 10$^{-5}$ | 3.50010 × 10$^{-7}$ | −4.63870 × 10$^{-9}$ | 0.00000 |
| 13 | 1.0000 | −2.58570 × 10$^{-4}$ | −1.65880 × 10$^{-5}$ | 3.58720 × 10$^{-8}$ | 0.00000 |
| 14 | 1.0000 | 1.32160 × 10$^{-4}$ | −1.54030 × 10$^{-5}$ | 0.00000 | 0.00000 |
| 18 | −3.5447 | 3.80330 × 10$^{-4}$ | −1.12040 × 10$^{-5}$ | 2.11590 × 10$^{-7}$ | 0.00000 |

[Zooming data]

| | Wide-angle end | Intermediate focal length | Telephoto end |
|---|---|---|---|
| f | 6.94220 | 12.00076 | 19.61658 |
| D0 | ∞ | ∞ | ∞ |
| D1 | 0.80028 | 6.50053 | 10.23411 |
| D2 | 6.16452 | 1.00014 | 1.00014 |
| D3 | 4.46935 | 3.93342 | 0.19991 |
| D4 | 5.74099 | 3.17604 | 1.39989 |
| D5 | 1.35704 | 3.92204 | 5.69818 |

[Conditional expressions]

| | |
|---|---|
| Conditional expression (1) | ndav = 1.822863 |
| Conditional expression (2) | ndG1av = 1.884355 |
| Refractive index average value of the first lens group comprising a prism = 1.92313 | |
| Conditional expression (3) | GRn = 12 |
| Conditional expression (4) | (TLw/fw + TLt/ft)/2 = 4.87506 |
| Conditional expression (5) | (TLw/fw + TLt/fw)/2 = 7.20156 |

It is clear that the above conditional expressions that the above conditional expressions (1) to (5) are all satisfied by this example.

Figure 10:
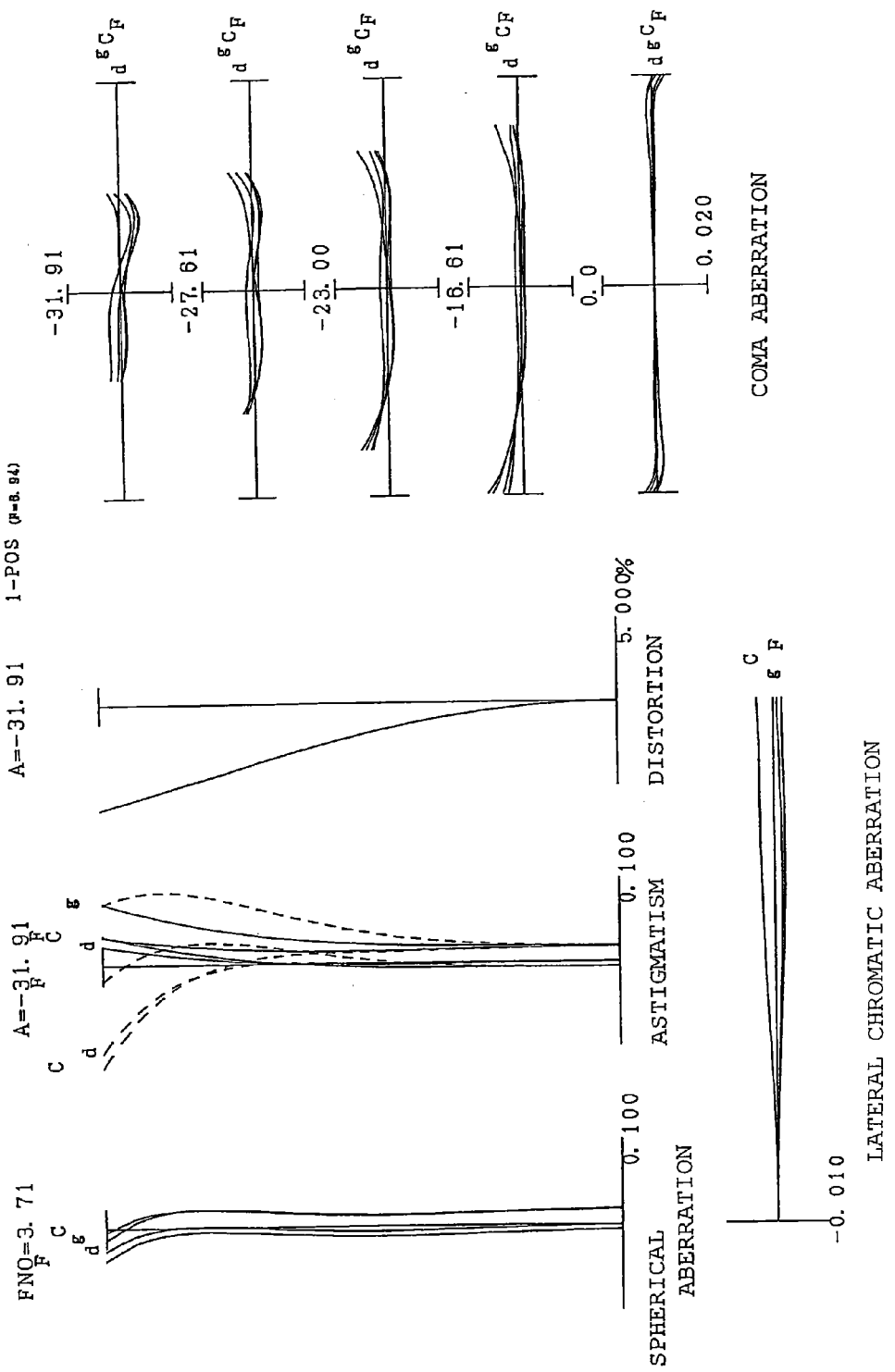
FIG. 10 is a graph showing various aberrations of the zoom lens according to Example 3 upon focusing on infinity in the wide-angle end state.
Figure 11:
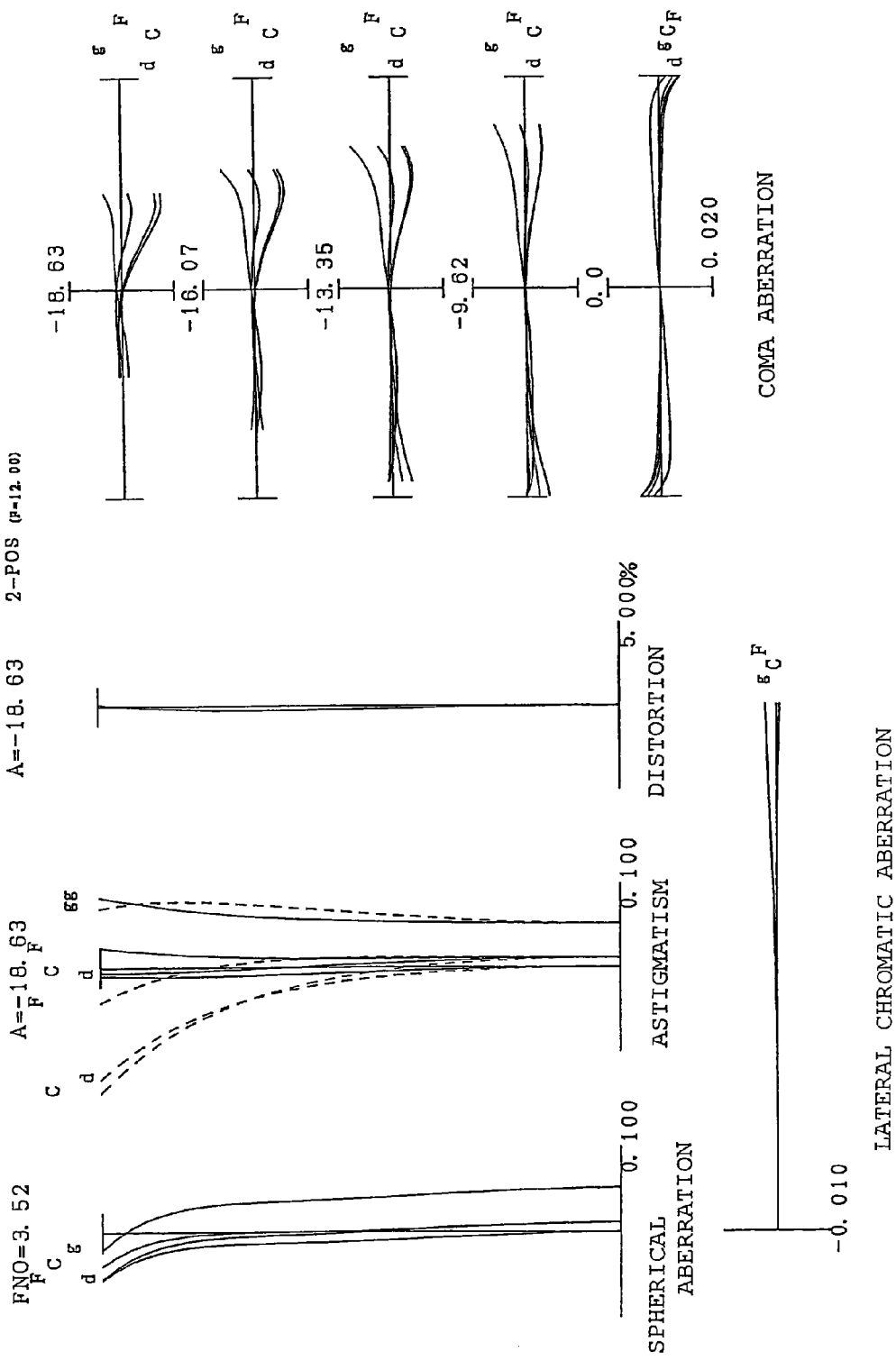
FIG. 11 is a graph showing various aberrations of the zoom lens according to Example 3 upon focusing on infinity in the intermediate focal length state.
Figure 12:
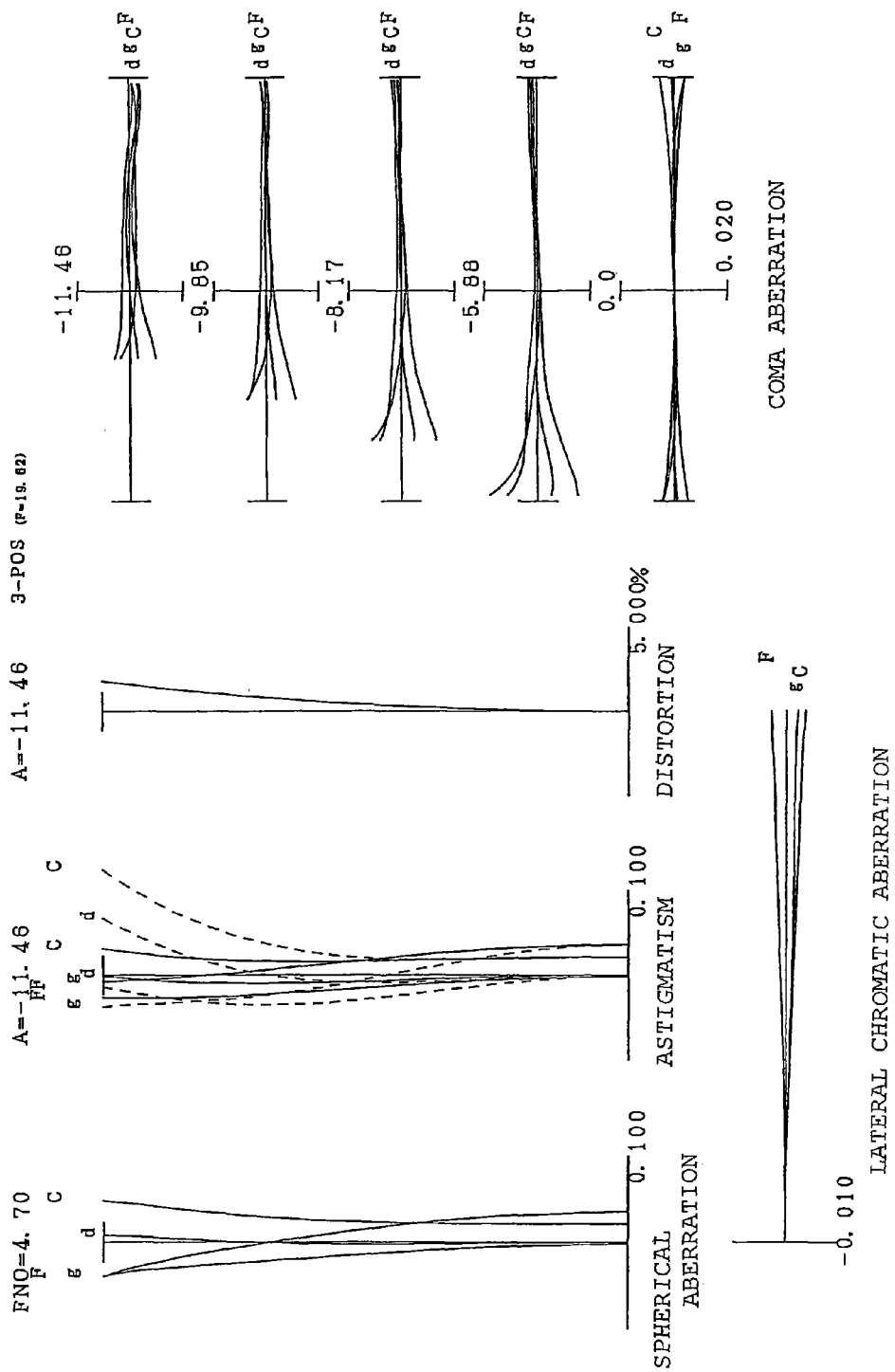
FIG. 12 is a graph showing various aberrations of the zoom lens according to Example 3 upon focusing on infinity in the telephoto end state.

FIGS. 10, 11, and 12 are graphs showing respectively various aberrations of the zoom lens upon focusing on infinity in the wide-angle end state, various aberrations of the zoom lens upon focusing on infinity in the intermediate focal length state, and various aberrations of the zoom lens upon focusing on infinity in the telephoto end state, according to Example 3. Further, as is shown in the respective aberration graphs, it is clear that the various aberrations are favorably corrected for the zoom lens ZL2 according to Example 3.

Example 4

Figure 13:
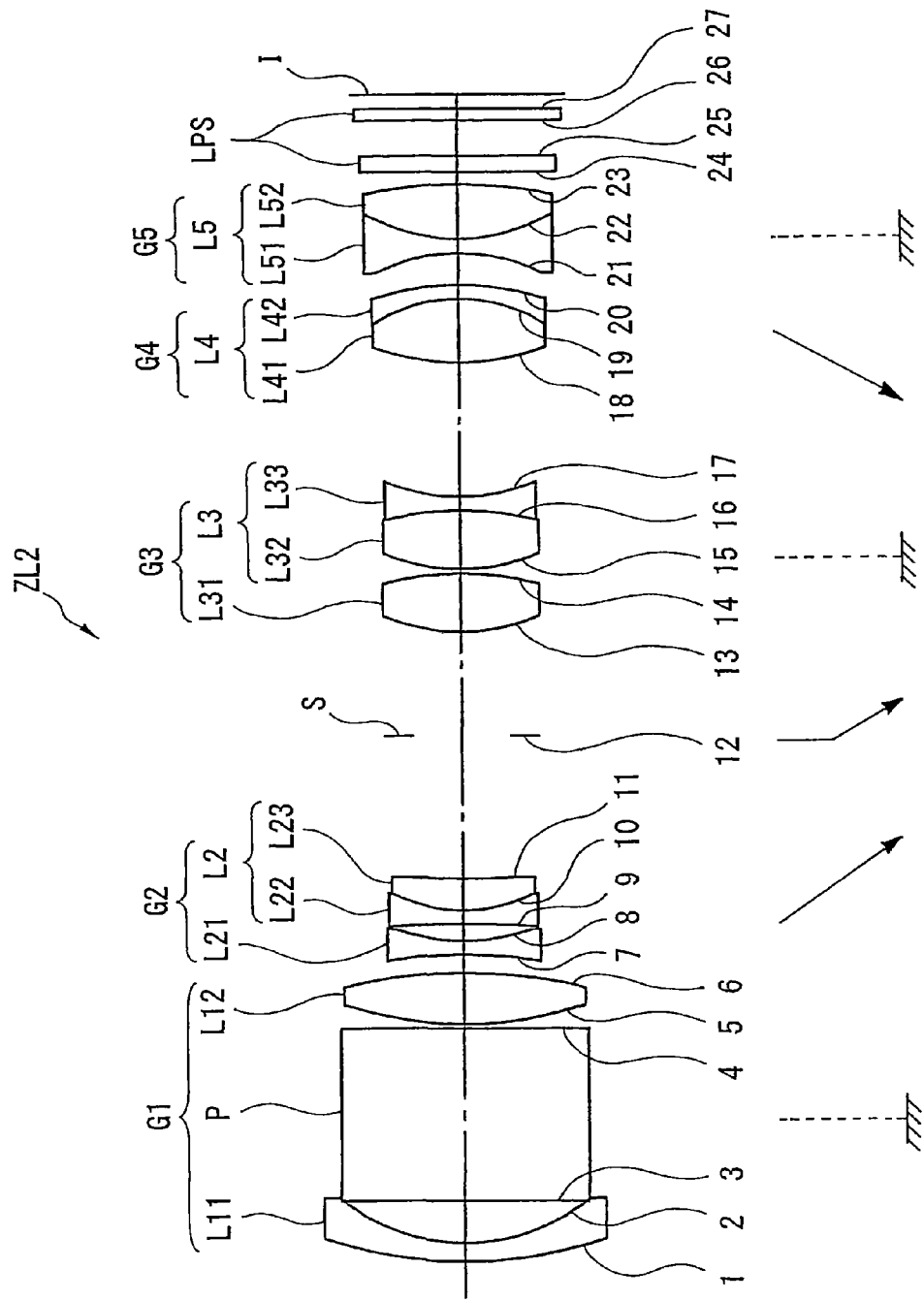
FIG. 13 is a lens constitutional view of the zoom lens according to Example 4.

Example 4 of the present invention will be described hereinbelow using FIGS. 13 to 16 and Table 4. FIG. 13 is a lens constitutional view of the zoom lens according to Example 4. The zoom lens ZL2 of Example 4 has the same constitution as that of the zoom lens ZL2 of Example 3 and a detailed description is omitted here by assigning the same reference numerals as in the case of Example 3 to the respective parts.

Table 4 below shows the parameters of the respective lenses of Example 4. The surface numbers 1 to 27 in Table 4 correspond to surfaces 1 to 27 in FIG. 13.

TABLE 4

[All parameters]

f = 6.94219 to 11.99998 to 19.61565
Bf = 0.59998
FNo = 3.72463 to 3.54119 to 4.70212
ω = 31.91229 to 18.62556 to 11.46410

[Lens parameters]

| Surface number | r | d | ν | n | |
|---|---|---|---|---|---|
| 1 | 18.8005 | 0.8000 | 25.46 | 2.000690 | |
| 2 | 8.5395 | 1.8000 | | | |
| 3 | ∞ | 7.4000 | 25.46 | 2.000690 | |
| 4 | ∞ | 0.2000 | | | |
| 5 | 15.5119 | 2.2000 | 49.23 | 1.768020 | (aspherical surface) |
| 6 | −24.4048 | D1 | | | (aspherical surface) |
| 7 | −19.9886 | 0.6000 | 52.32 | 1.755000 | |
| 8 | 8.9315 | 0.7100 | | | |
| 9 | −61.5185 | 0.6000 | 52.32 | 1.755000 | |
| 10 | 6.7860 | 1.3500 | 25.46 | 2.000690 | |
| 11 | 29.7103 | D2 | | | |
| 12 | ∞ | D3 | | | (aperture stop) |
| 13 | 8.1504 | 2.5000 | 59.44 | 1.583130 | (aspherical surface) |
| 14 | −12.5408 | 0.2000 | | | (aspherical surface) |
| 15 | 8.7465 | 2.5000 | 56.05 | 1.568829 | |
| 16 | −12.9663 | 0.6000 | 31.31 | 1.903660 | |
| 17 | 8.5922 | D4 | | | |
| 18 | 10.5314 | 2.7000 | 67.05 | 1.592010 | (aspherical surface) |
| 19 | −6.9443 | 0.6000 | 25.46 | 2.000690 | |
| 20 | −11.7412 | D5 | | | |
| 21 | −7.9335 | 0.6000 | 25.46 | 2.000690 | |
| 22 | 8.0501 | 2.3000 | 17.98 | 1.945950 | |
| 23 | −19.7209 | 0.5528 | | | |
| 24 | ∞ | 0.6500 | 70.51 | 1.544370 | |
| 25 | ∞ | 1.5000 | | | |
| 26 | ∞ | 0.5000 | 64.10 | 1.516800 | |
| 27 | ∞ | Bf | | | |

[Aspherical surface data]

| Surface number | K | C4 | C6 | C8 | C10 |
|---|---|---|---|---|---|
| 5 | 1.0000 | $-5.74590 \times 10^{-5}$ | $-5.56500 \times 10^{-7}$ | $1.12310 \times 10^{-8}$ | 0.00000 |
| 6 | 1.0000 | $-6.77990 \times 10^{-5}$ | $-1.33990 \times 10^{-7}$ | $6.59870 \times 10^{-9}$ | 0.00000 |
| 13 | 1.0000 | $-2.45410 \times 10^{-4}$ | $-7.65390 \times 10^{-6}$ | $-4.01050 \times 10^{-8}$ | 0.00000 |
| 14 | 1.0000 | $1.84270 \times 10^{-4}$ | $-7.37050 \times 10^{-6}$ | 0.00000 | 0.00000 |
| 18 | 1.0747 | $-7.18170 \times 10^{-5}$ | $-8.63640 \times 10^{-6}$ | $2.76860 \times 10^{-7}$ | 0.00000 |

[Zooming data]

| | Wide-angle end | Intermediate focal length | Telephoto end |
|---|---|---|---|
| f | 6.94219 | 11.99998 | 19.61565 |
| D0 | ∞ | ∞ | ∞ |
| D1 | 0.80028 | 6.50053 | 10.23411 |
| D2 | 6.16453 | 1.00015 | 1.00015 |
| D3 | 4.46935 | 3.93342 | 0.19991 |
| D4 | 5.74098 | 3.17603 | 1.39988 |
| D5 | 1.35703 | 3.92203 | 5.69817 |

[Conditional expressions]

Conditional expression (1)  ndav = 1.822863
Conditional expression (2)  ndG1av = 1.884355
Refractive index average value of the first lens group comprising a prism = 1.92727

TABLE 4-continued

| Conditional expression (3) | GRn = 12 |
|---|---|
| Conditional expression (4) | (TLw/fw + TLt/ft)/2 = 4.87513 |
| Conditional expression (5) | (TLw/fw + TLt/fw)/2 = 7.20157 |

It is clear that the above conditional expressions (1) to (5) are all satisfied by this example.

Figure 14:
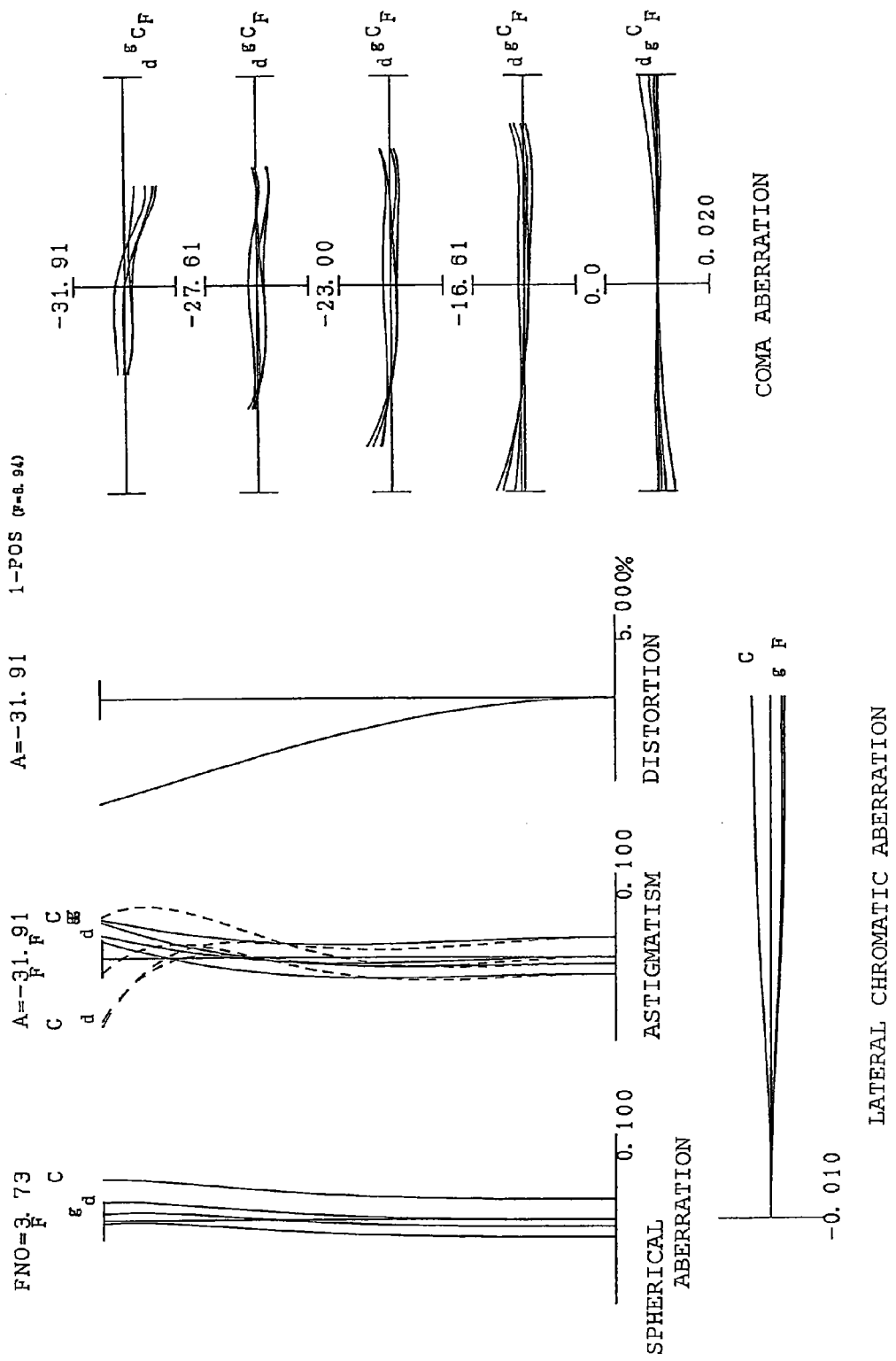
FIG. 14 is a graph showing various aberrations of the zoom lens according to Example 4 upon focusing on infinity in the wide-angle end state.
Figure 15:
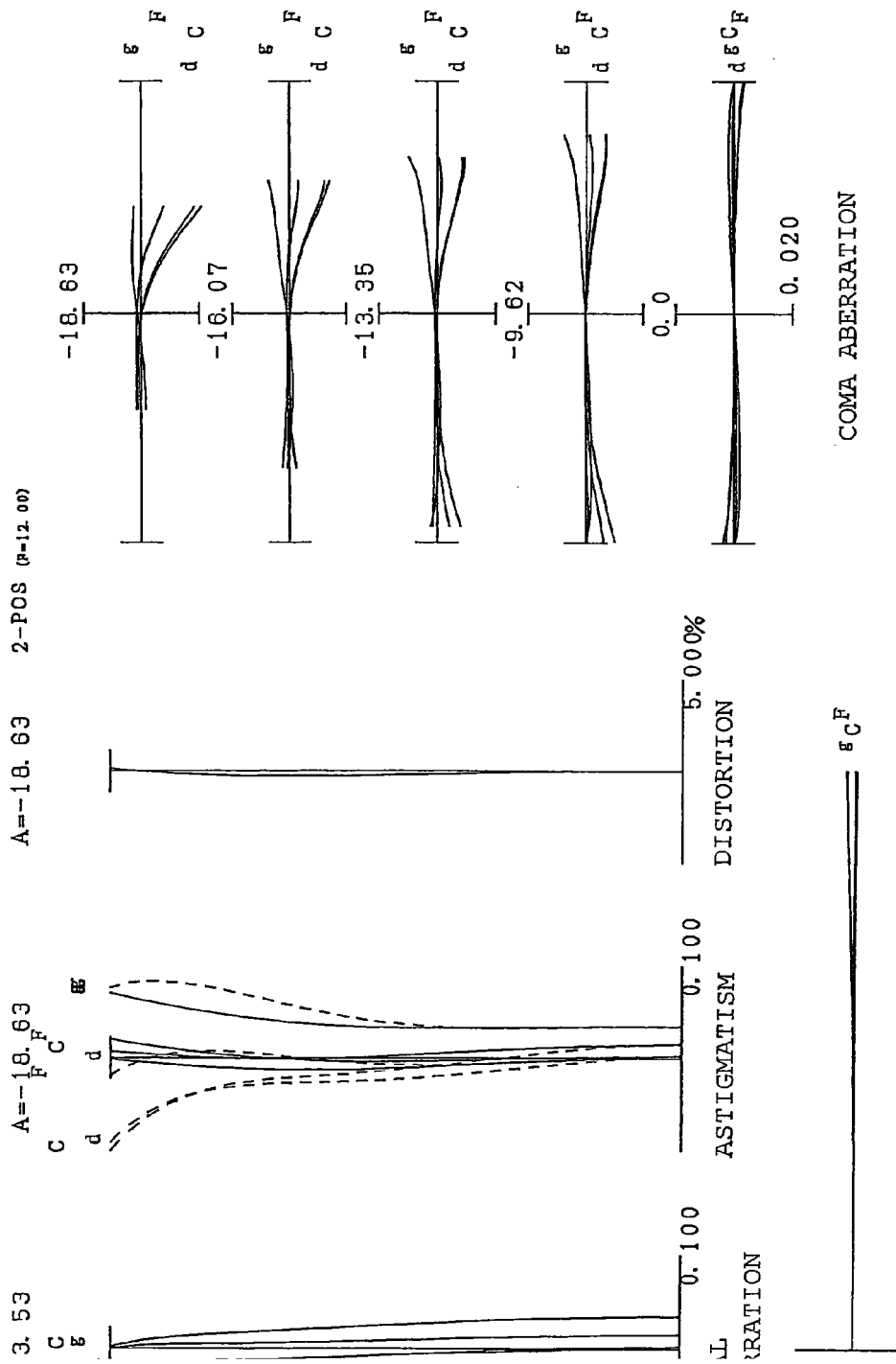
FIG. 15 is a graph showing various aberrations of the zoom lens according to Example 4 upon focusing on infinity in the intermediate focal length state.
Figure 16:
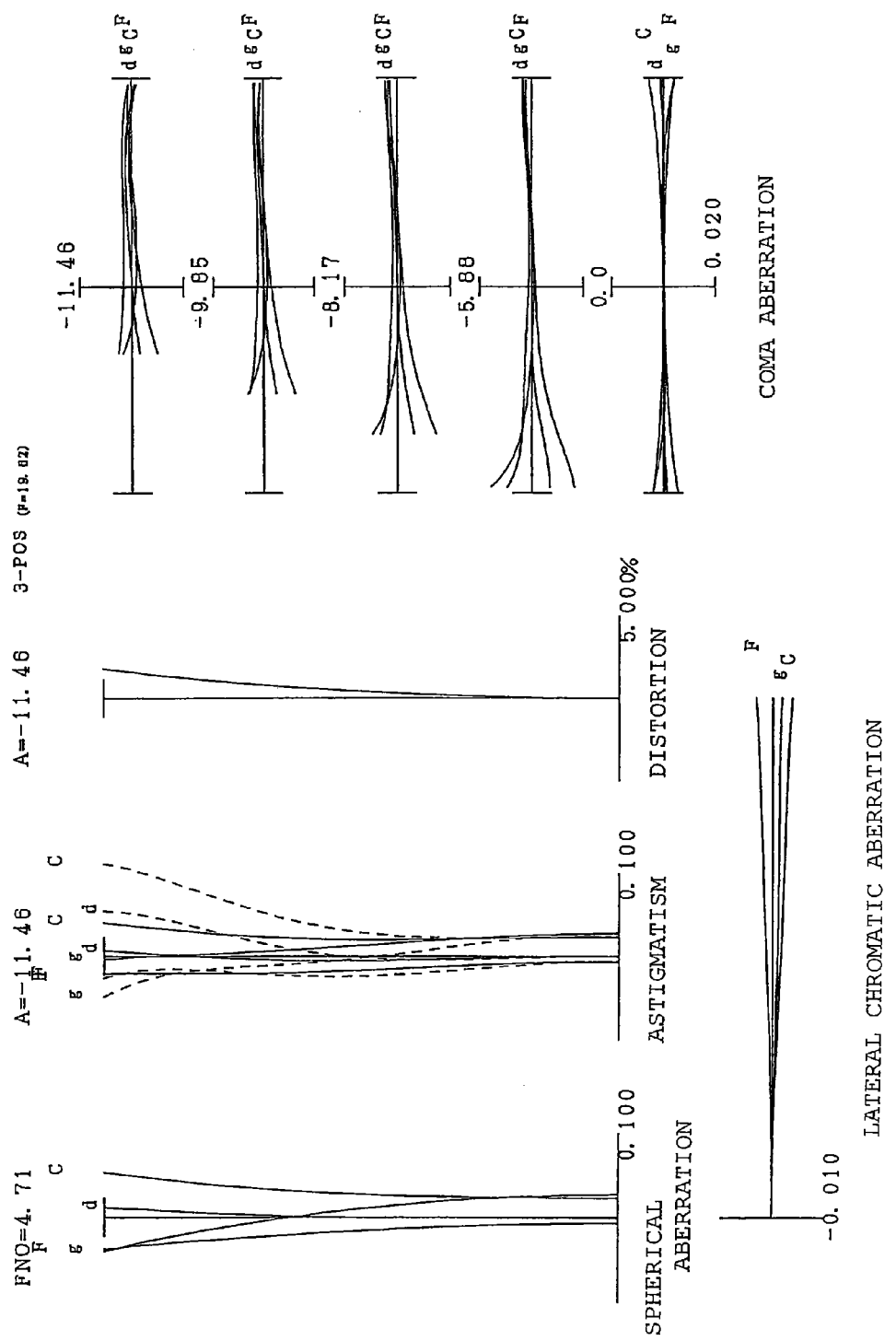
FIG. 16 is a graph showing various aberrations of the zoom lens according to Example 4 upon focusing on infinity in the telephoto end state.

FIGS. 14, 15, and 16 are graphs showing respectively various aberrations of the zoom lens upon focusing on infinity in the wide-angle end state, various aberrations of the zoom lens upon focusing on infinity in the intermediate focal length state, and various aberrations of the zoom lens upon focusing on infinity in the telephoto end state, according to Example 4. Further, as is shown in the respective aberration graphs, it is clear that the various aberrations are favorably corrected for the zoom lens ZL2 according to Example 4.

Example 5

Figure 17:
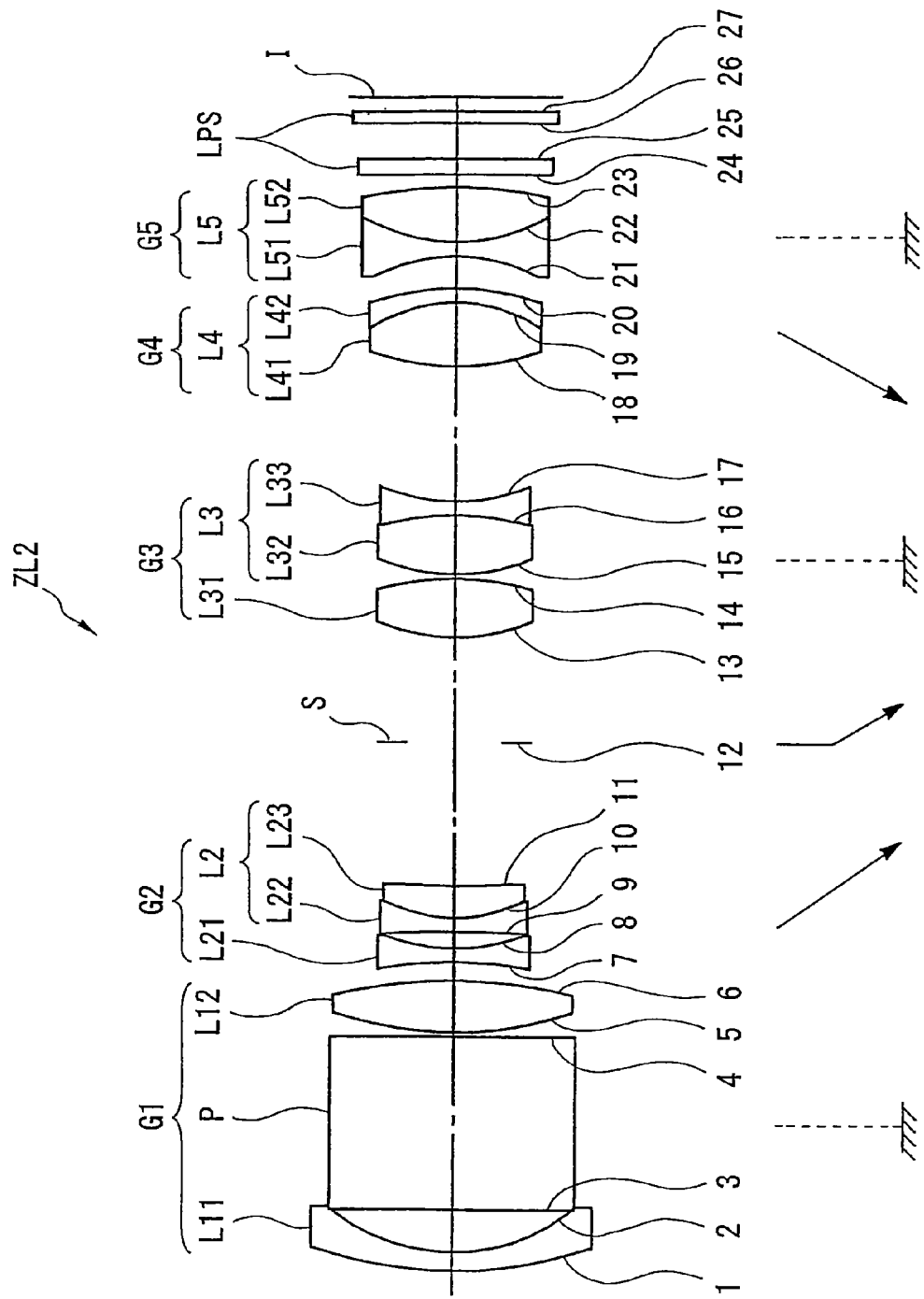
FIG. 17 is a lens constitutional view of the zoom lens according to Example 5.

Example 5 of the present invention will be described hereinbelow using FIGS. 17 to 20 and Table 5. FIG. 17 is a lens constitutional view of the zoom lens according to Example 5. The zoom lens ZL2 of Example 5 has the same constitution as that of the zoom lens ZL2 of Example 3 and a detailed description is omitted here by assigning the same reference numerals as in the case of Example 3 to the respective parts.

Table 5 below shows the parameters of the respective lenses of Example 5. The surface numbers 1 to 27 in Table 5 correspond to surfaces 1 to 27 in FIG. 17.

TABLE 5

[All parameters]

f = 6.94219 to 11.99998 to 19.61565
Bf = 0.59998
FNo = 3.72462 to 3.54119 to 4.70216
ω = 31.91221 to 18.62543 to 11.46404

[Lens parameters]

| Surface number | r | d | ν | n | |
|---|---|---|---|---|---|
| 1 | 18.8189 | 0.8000 | 25.46 | 2.000694 | |
| 2 | 8.5437 | 1.8000 | | | |
| 3 | ∞ | 7.4000 | 25.46 | 2.000694 | |
| 4 | ∞ | 0.2000 | | | |
| 5 | 15.5104 | 2.2000 | 49.23 | 1.768020 | (aspherical surface) |
| 6 | −24.4098 | D1 | | | (aspherical surface) |
| 7 | −19.9912 | 0.6000 | 52.32 | 1.755000 | |
| 8 | 8.9271 | 0.7100 | | | |
| 9 | −61.6899 | 0.6000 | 52.32 | 1.755000 | |
| 10 | 6.7805 | 1.3500 | 25.46 | 2.000694 | |
| 11 | 29.6842 | D2 | | | |
| 12 | ∞ | D3 | | | (aperture stop) |
| 13 | 8.1490 | 2.5000 | 59.46 | 1.583130 | (aspherical surface) |
| 14 | −12.5528 | 0.2000 | | | (aspherical surface) |
| 15 | 8.7443 | 2.5000 | 56.04 | 1.568829 | |
| 16 | −13.0122 | 0.6000 | 31.31 | 1.903658 | |
| 17 | 8.5865 | D4 | | | |
| 18 | 10.5303 | 2.7000 | 67.05 | 1.592010 | (aspherical surface) |
| 19 | −6.9399 | 0.6000 | 25.46 | 2.000694 | |
| 20 | −11.7369 | D5 | | | |
| 21 | −7.9336 | 0.6000 | 25.46 | 2.000694 | |
| 22 | 8.0501 | 2.3000 | 17.98 | 1.945944 | |
| 23 | −19.7207 | 0.5528 | | | |
| 24 | ∞ | 0.6500 | 70.51 | 1.544370 | |
| 25 | ∞ | 1.5000 | | | |
| 26 | ∞ | 0.5000 | 64.19 | 1.516798 | |
| 27 | ∞ | Bf | | | |

[Aspherical surface data]

| Surface number | K | C4 | C6 | C8 | C10 |
|---|---|---|---|---|---|
| 5 | 1.0000 | −5.74340 × $10^{-5}$ | −5.57880 × $10^{-7}$ | 1.16290 × $10^{-8}$ | 0.00000 |
| 6 | 1.0000 | −6.76660 × $10^{-5}$ | −1.33000 × $10^{-7}$ | 6.92850 × $10^{-9}$ | 0.00000 |
| 13 | 1.0000 | −2.44040 × $10^{-4}$ | −7.46620 × $10^{-6}$ | −4.19530 × $10^{-8}$ | 0.00000 |
| 14 | 1.0000 | 1.86350 × $10^{-4}$ | −7.21100 × $10^{-6}$ | 0.00000 | 0.00000 |
| 18 | 0.9151 | −5.41070 × $10^{-5}$ | −8.45650 × $10^{-6}$ | 2.74530 × $10^{-7}$ | 0.00000 |

[Zooming data]

| | Wide-angle end | Intermediate focal length | Telephoto end |
|---|---|---|---|
| f | 6.94219 | 11.99998 | 19.61565 |
| D0 | ∞ | ∞ | ∞ |

TABLE 5-continued

| D1 | 0.80029 | 6.50054 | 10.23412 |
| D2 | 6.16453 | 1.00015 | 1.00015 |
| D3 | 4.46935 | 3.93342 | 0.19991 |
| D4 | 5.74098 | 3.17603 | 1.39988 |
| D5 | 1.35702 | 3.92202 | 5.69816 |

[Conditional expressions]

| Conditional expression (1) | ndav = 1.822863 |
| Conditional expression (2) | ndG1av = 1.884355 |
| Refractive index average value of the first lens group comprising a prism = 1.92313 | |
| Conditional expression (3) | GRn = 12 |
| Conditional expression (4) | (TLw/fw + TLt/ft)/2 = 4.89076 |
| Conditional expression (5) | (TLw/fw + TLt/fw)/2 = 7.23283 |

It is clear that the above conditional expressions (1) to (5) are all satisfied by this example.

Figure 18:
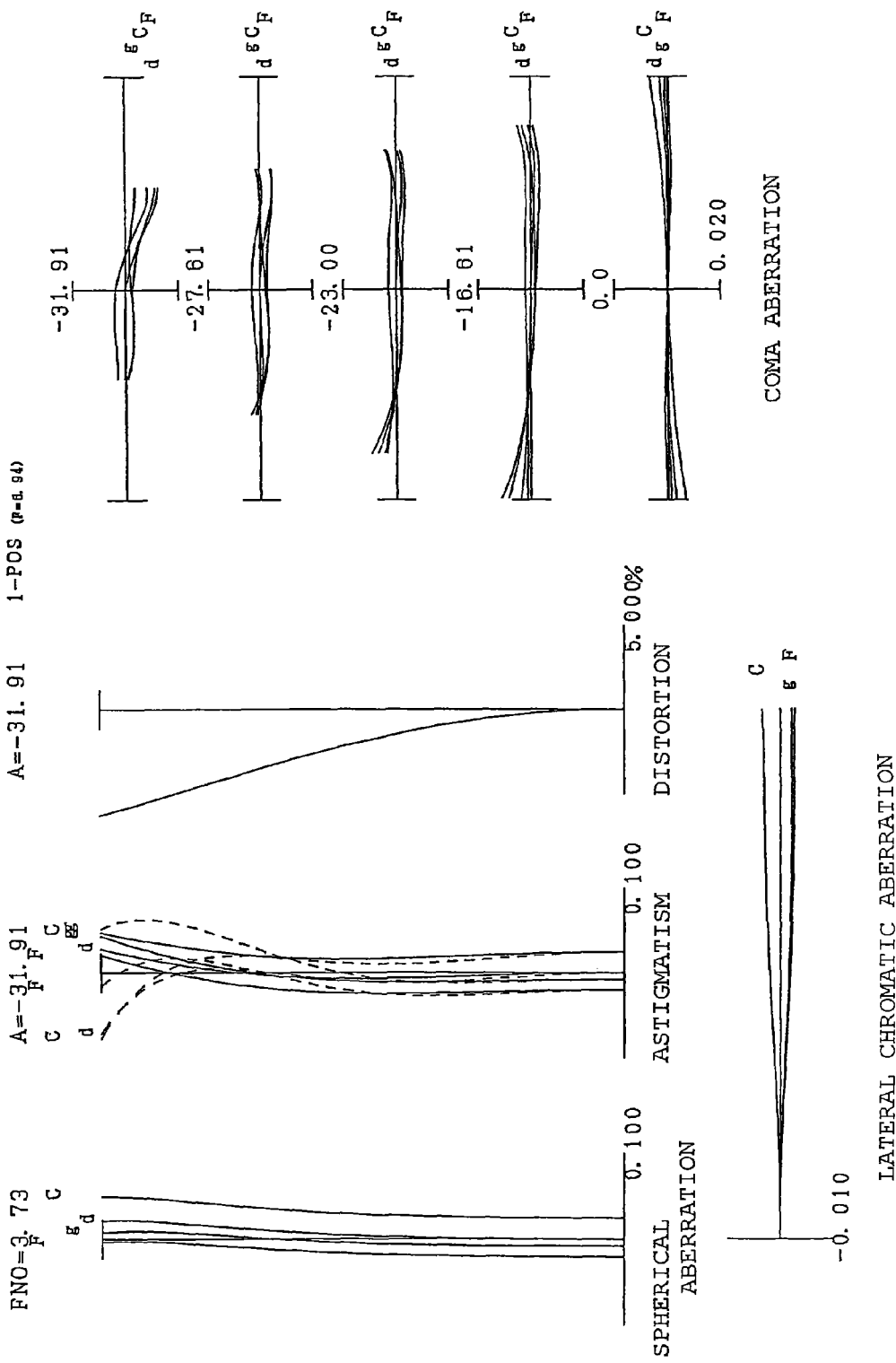
FIG. 18 is a graph showing various aberrations of the zoom lens according to Example 5 upon focusing on infinity in the wide-angle end state.
Figure 19:
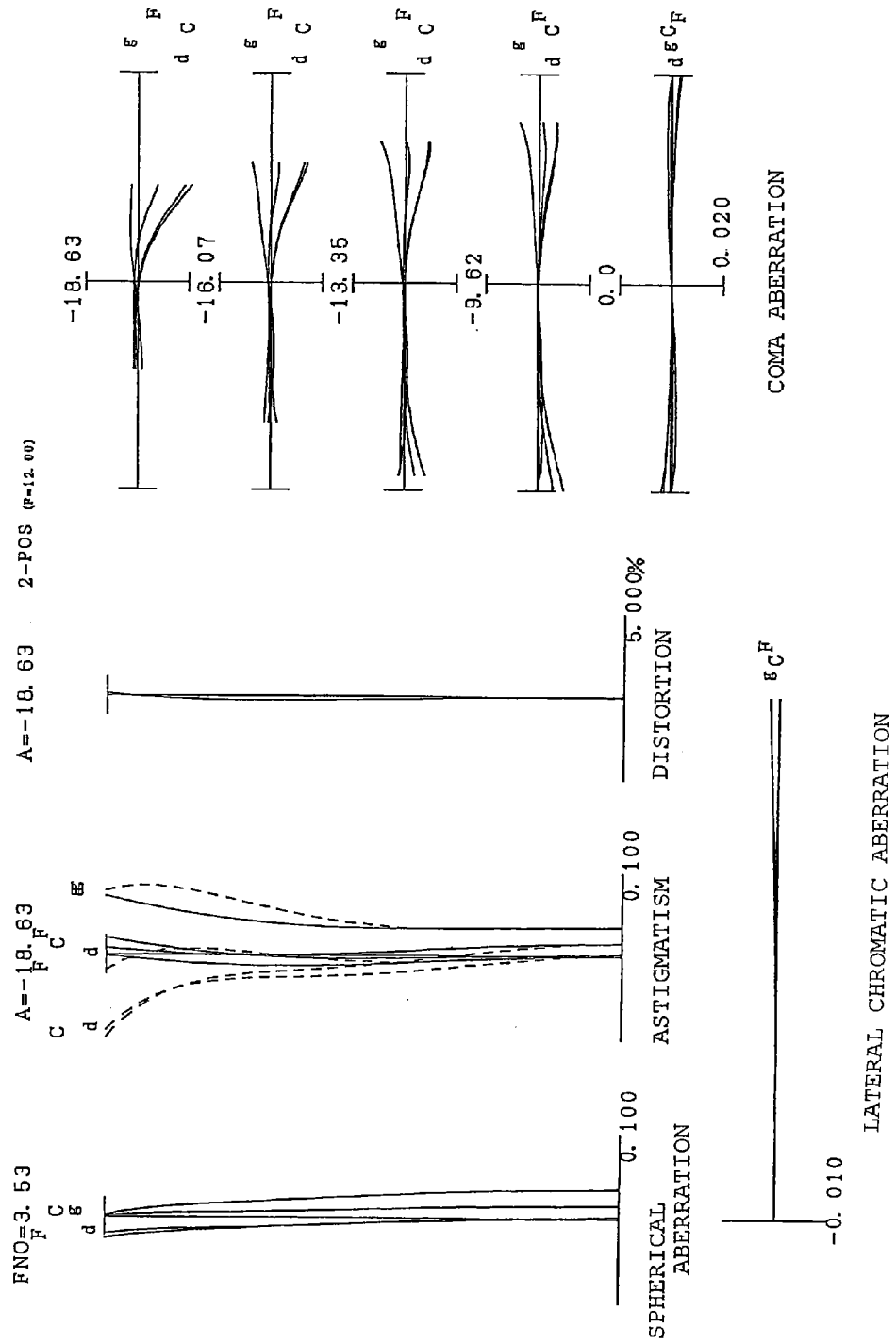
FIG. 19 is a graph showing various aberrations of the zoom lens according to Example 5 upon focusing on infinity in the intermediate focal length state.
Figure 20:
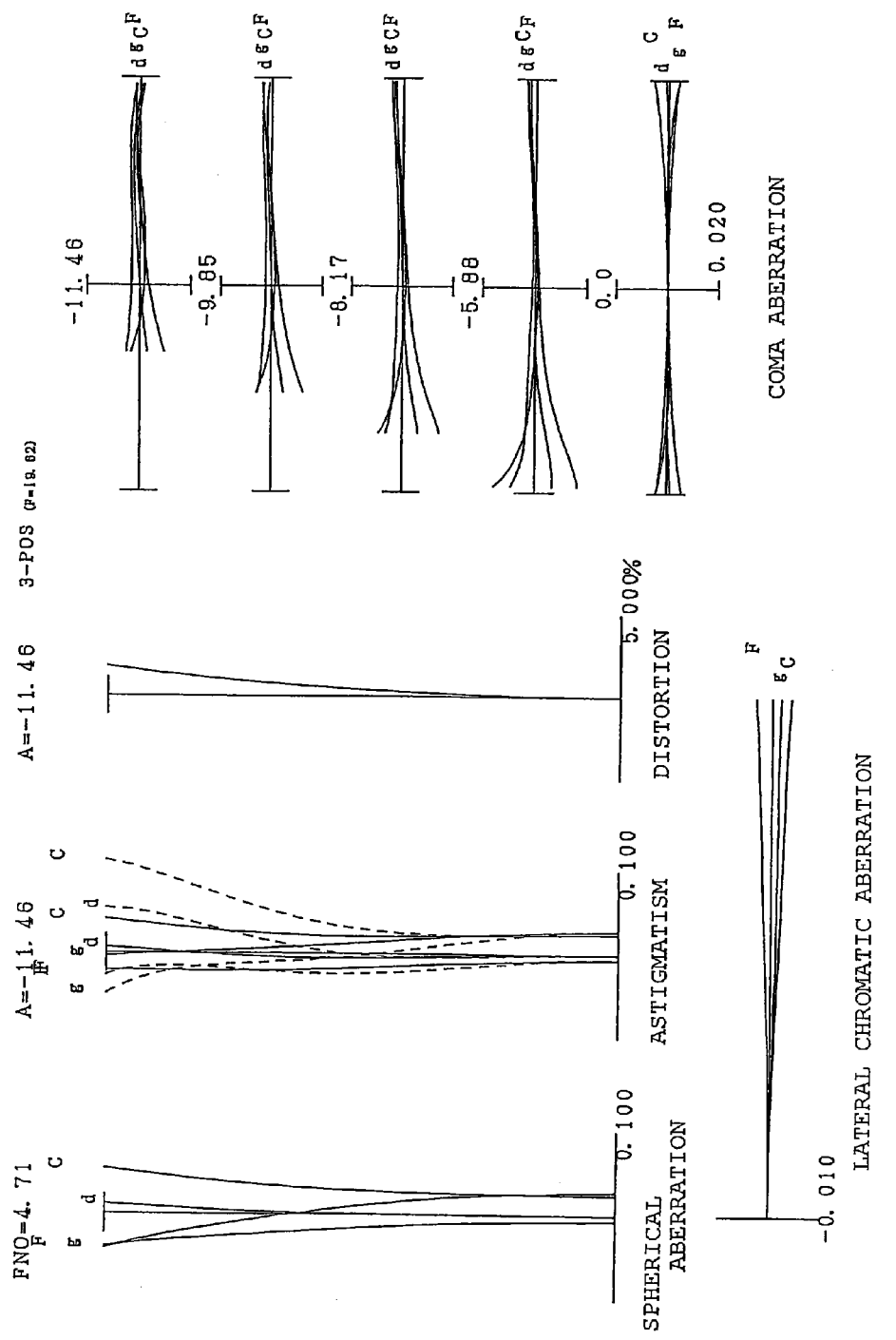
FIG. 20 is a graph showing various aberrations of the zoom lens according to Example 5 upon focusing on infinity in the telephoto end state.

FIGS. 18, 19, and 20 are graphs showing respectively various aberrations of the zoom lens upon focusing on infinity in the wide-angle end state, various aberrations of the zoom lens upon focusing on infinity in the intermediate focal length state, and various aberrations of the zoom lens upon focusing on infinity in the telephoto end state, according to Example 5. Further, as is shown in the respective aberration graphs, it is clear that the various aberrations are favorably corrected for the zoom lens ZL2 according to Example 5.

The following content can be suitably applied to each of the above examples to an extent that does not impair the optical performance.

Although a two-group constitution and a five-group constitution were illustrated for the zoom lens in each of the above examples, the present invention can also be applied to a zoom lens with another group constitution.

In addition, by moving a single lens group or a plurality of lens groups or a partial lens group in the direction of the optical axis, a focusing lens group that focuses on objects ranging from infinite objects to short-range objects may be established. The focusing lens group can also be applied to autofocus and is also suited to the driving of an autofocus motor (using an ultrasound motor or the like). In particular, the focusing lens group is preferably rendered by the first lens group in the case of a two-group constitution and by the second or fourth lens group in the case of a five-group constitution.

Moreover, by moving the lens group or partial lens group in a direction that is perpendicular to the optical axis, a vibration-proof lens group that corrects image blurring caused by hand shake may also be produced. In particular, the second lens group is preferably rendered a vibration-proof lens group in the case of a two group constitution and any of the second, third, and fourth lens groups is preferably made a vibration-proof lens group in the case of a five-group constitution.

In addition, the respective lens planes may be aspherical surfaces. Here, an aspherical surface which is produced by grinding, a glass mold aspherical surface produced by forming glass in an aspherical surface shape in a mold, or a composite aspherical surface produced by forming resin in an aspherical shape on the surface of glass is possible.

Furthermore, the aperture stop is preferably disposed in the second lens group in the case of a two-group constitution or between the second lens group and the third lens group in the case of a five group constitution. However, instead of providing an aperture stop member, the role of the aperture stop may also be replaced with a lens frame.

In addition, an antireflection film with a high transmittance over a wide wavelength can be provided on each lens surface in order to be able to achieve a high optical performance which achieves a high contrast and reduces flare and ghost.

Although the constitutional requirements of this example were described in order to explain the present invention in a way that facilitates understanding, it goes without saying that the present invention is not limited to these constitutional requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens having a plurality of lens groups which are disposed in order from an object, wherein, where a refractive index average value of lens components which constitute the zoom lens is defined as ndav and a refractive index average value of lens components which constitute a first lens group which is disposed closest to the object among the plurality of lens groups is defined as ndG1av, the conditions of the following expressions $$ndav \geq 1.82$$

$$ndG1av \geq 1.85$$

are satisfied.

2. The zoom lens according to claim 1, wherein the first lens group has negative refractive power.

3. The zoom lens according to claim 2, wherein the plurality of lens groups comprises the first lens group and a second lens group which has positive refractive power and is disposed to an image side of the first lens group.

4. The zoom lens according to claim 2, wherein, where the total length of the zoom lens in a wide-angle end state is defined as TLw, the total length of the zoom lens in a telephoto end state is defined as TLt, and a focal length of the zoom lens in the telephoto end state is defined as ft, the condition of the following expression $$1.0 < (TLw/ft + TLt/ft)/2 < 2.0$$

is satisfied.

5. The zoom lens according to claim 1, wherein the first lens group has positive refractive power.

6. The zoom lens according to claim 5, wherein the plurality of lens groups comprises, in order from the object, the first lens group, a second lens group which has negative refractive power, a third lens group which has positive refractive power, a fourth lens group which has positive refractive power, and a fifth lens group which has negative refractive power.

7. The zoom lens according to claim 6, wherein the first lens group comprises an optical element that bends the path of light.

8. The zoom lens according to claim 7, wherein the optical element is a prism and a refractive index average value of optical members which constitute the first lens group is equal to or more than 1.85.

9. The zoom lens according to claim 1, wherein the first lens group comprises a plurality of lens components.

10. The zoom lens according to claim 1, wherein, among the plurality of lens groups, a second lens group which is disposed to an image side of the first lens group comprises a plurality of lens components.

11. The zoom lens according to claim 1, wherein, where the number of all the lens components which constitute the zoom lens is defined as GRn, the condition of the following expression $$4 < GRn < 16$$

is satisfied.

12. The zoom lens according to claim 1, wherein the first lens group comprises a lens component which has an aspherical surface.

13. The zoom lens according to claim 1, wherein, where the total length of the zoom lens in a wide-angle end state is defined as TLw, the total length of the zoom lens in a telephoto end state is defined as TLt, a focal length of the zoom lens in the wide-angle end state is defined as fw, and a focal length of the zoom lens in the telephoto end state is defined as ft, the condition of the following expression $$2.5 < (TLw/fw + TLt/ft)/2 < 6.0$$

is satisfied.

14. The zoom lens according to claim 1, wherein, where the total length of the zoom lens in a wide-angle end state is defined as TLw, the total length of the zoom lens in a telephoto end state is defined as TLt, and a focal length of the zoom lens in the wide-angle end state is defined as fw, the condition of the following expression $$3.0 < (TLw/fw + TLt/fw)/2 < 10.0$$

is satisfied.

15. An optical apparatus equipped with the zoom lens according to claim 1.

16. A method for forming an image of an object, comprising: providing a plurality of lens groups which are disposed in order from the object; and
Satisfying the following conditional expressions $$ndav \geq 1.82$$

$$ndGlav \geq 1.85$$

where ndav denotes a refractive index average value of lens components which constitute the zoom lens and ndGlav denotes a refractive index average value of lens components which constitute a first lens group that is disposed closest to the object.

17. The method according to claim 16, wherein the plurality of lens groups comprises the first lens group which has negative refractive power and a second lens group which has positive refractive power and is disposed to an image side of the first lens group.

18. The method according to claim 17, wherein, where the total length of the zoom lens in a wide-angle end state is defined as TLw, the total length of the zoom lens in a telephoto end state is defined as TLt, and a focal length of the zoom lens in the telephoto end state is defined as ft, the condition of the following expression $$1.0 < (TLw/ft + TLt/ft)/2 < 2.0$$

is satisfied.

19. The method according to claim 16, wherein the plurality of lens groups comprises, in order from the object, the first lens group which has positive refractive power, a second lens group which has negative refractive power, a third lens group which has positive refractive power, a fourth lens group which has positive refractive power, and a fifth lens group which has negative refractive power.

20. The method according to claim 19, wherein the first lens group comprises an optical element that bends the path of light and a refractive index average value of optical members which constitute the first lens group is equal to or more than 1.85.

21. The method according to claim 16, wherein, where the number of all the lens components which constitute the zoom lens is defined as GRn, the condition of the following expression $$4 < GRn < 16$$

is satisfied.

22. The method according to claim 16, wherein the first lens group comprises a lens component which has an aspherical surface.

23. The method according to claim 16, wherein, where the total length of the zoom lens in a wide-angle end state is defined as TLw, the total length of the zoom lens in a telephoto end state is defined as TLt, a focal length of the zoom lens in the wide-angle end state is defined as fw, and a focal length of the zoom lens in the telephoto end state is defined as ft, the condition of the following expression $$2.5 < (TLw/fw + TLt/ft)/2 < 6.0$$

is satisfied.

24. The method according to claim 16, wherein, where the total length of the zoom lens in a wide-angle end state is defined as TLw, the total length of the zoom lens in a telephoto end state is defined as TLt, and a focal length of the zoom lens in the wide-angle end state is defined as fw, the condition of the following expression $$3.0 < (TLw/fw + TLt/fw)/2 < 10.0$$

is satisfied.

25. A zoom lens having a plurality of lens groups which are disposed in order from an object, wherein, the plurality of lens groups consists of a first lens group and a second lens group, where a refractive index average value of lens components which constitute the zoom lens is defined as ndav and a refractive index average value of lens components which constitute the first lens group which is disposed closest to the object among the plurality of lens groups is defined as ndGlav, the conditions of the following expressions $$ndav \geq 1.80$$

$$ndGlav \geq 1.85$$

are satisfied.

26. The zoom lens according to claim 25, wherein the condition of the following expression $$ndav \geq 1.82$$

is satisfied.

27. A zoom lens having a plurality of lens groups which are disposed in order from an object, wherein, the plurality of lens groups consists of a first lens group and a second lens group, wherein, where a refractive index average value of lens components which constitute the zoom lens is defined as ndav, a refractive index average value of lens components which constitute a first lens group which is disposed closest to the object among the plurality of lens groups is defined as ndGlav and the number of the lens components which constitute the zoom lens is defined as GRn, the conditions of the following expressions $$ndav \geq 1.80$$

$$ndGlav \geq 1.85$$

$$GRn=5$$

are satisfied.

28. The zoom lens according to claim 27, wherein the condition of the following expression $$ndav \geq 1.82$$

is satisfied.

29. A zoom lens having a plurality of lens groups which are disposed in order from an object, wherein,
    the plurality of lens groups comprises a first lens group and a second lens group which is disposed to an image side of the first lens group,
    the second lens group comprises lens components defining two air gaps,
    where a refractive index average value of lens components which constitute the zoom lens is defined as ndav and a refractive index average value of lens components which constitute a first lens group which is disposed closest to the object among the plurality of lens groups is defined as ndGlav, the conditions of the following expressions $$ndav \geq 1.80$$

$$ndGlav \geq 1.85$$

are satisfied.

30. The zoom lens according to claim 29, wherein the condition of the following expression $$ndav \geq 1.82$$

is satisfied.

31. A zoom lens having a plurality of lens groups which are disposed in order from an object, wherein,
    the plurality of lens groups comprises a first lens group and a second lens group which is disposed to an image side of the first lens group, the first lens group always moves along the optical axis toward the second lens group upon zooming from a wide-angle end state to a telephoto end state,
    where a refractive index average value of lens components which constitute the zoom lens is defined as ndav and a refractive index average value of lens components which constitute the first lens group is defined as ndGlav, the conditions of the following expressions $$ndav \geq 1.80$$

$$ndGlav \geq 1.85$$

are satisfied.

32. The zoom lens according to claim 31, wherein the condition of the following expression $$ndav \geq 1.82$$

is satisfied.

* * * * *